(12) United States Patent
Ikeda et al.

(10) Patent No.: US 10,434,741 B2
(45) Date of Patent: Oct. 8, 2019

(54) COMPOSITE MOLDED ARTICLE

(71) Applicants: Daicel Polymer Ltd., Tokyo (JP); Daicel Corporation, Osaka-shi, Osaka (JP)

(72) Inventors: Daiji Ikeda, Himeji (JP); Yoshihiro Asami, Himeji (JP)

(73) Assignees: DAICEL POLYMER LTD., Tokyo (JP); DAICEL CORPORATION, Osaka-shi, Osaka (JP)

(*) Notice: Subject to any disclaimer, the term of this patent is extended or adjusted under 35 U.S.C. 154(b) by 615 days.

(21) Appl. No.: 14/905,357

(22) PCT Filed: Jul. 16, 2014

(86) PCT No.: PCT/JP2014/068855
§ 371 (c)(1),
(2) Date: Jan. 15, 2016

(87) PCT Pub. No.: WO2015/008771
PCT Pub. Date: Jan. 22, 2015

(65) Prior Publication Data
US 2016/0151993 A1 Jun. 2, 2016

(30) Foreign Application Priority Data
Apr. 25, 2014 (JP) ................ 2014-090885

(51) Int. Cl.
*B32B 3/26* (2006.01)
*B32B 7/04* (2019.01)
(Continued)

(52) U.S. Cl.
CPC .......... *B32B 3/263* (2013.01); *B23K 26/3584* (2018.08); *B29C 43/18* (2013.01);
(Continued)

(58) Field of Classification Search
CPC ..... Y10T 428/24612; Y10T 428/24355; Y10T 428/24364; B32B 3/26; B32B 3/263; B32B 15/08; B32B 7/04; B32B 2250/02
(Continued)

(56) References Cited

U.S. PATENT DOCUMENTS 4,308,153 A * 12/1981 Mori .................... C10M 169/04
428/545
4,861,407 A 8/1989 Volkmann et al.
(Continued)

FOREIGN PATENT DOCUMENTS

| CN | 102470636 A | 5/2012 |
|---|---|---|
| CN | 103507203 A | 1/2014 |

(Continued)

OTHER PUBLICATIONS

European Patent Office Search Report from corresponding application No. 14826886.5, dated Jun. 12, 2017 (14 pgs.).
(Continued)

*Primary Examiner* — Joanna Pleszczynska
(74) *Attorney, Agent, or Firm* — Flynn Thiel, P.C.

(57) ABSTRACT

A composite molded article contains a metal molded article and a resin molded article, which are bonded to each other, in which the metal molded article has a roughened bonding surface, a surface layer portion of the metal molded article including the roughened bonding surface has: open holes containing: a stem hole that is formed in a thickness direction and has an opening on the side of the bonding surface, and a branch hole that is formed from an inner wall of the stem hole in a different direction from the stem hole, and the composite molded article is bonded in such a state that the resin permeates into the open holes formed on the bonding surface of the metal molded article.

8 Claims, 21 Drawing Sheets

(51) Int. Cl.
  *B32B 7/12* (2006.01)
  *B32B 15/01* (2006.01)
  *B32B 15/06* (2006.01)
  *B32B 15/08* (2006.01)
  *B29C 45/14* (2006.01)
  *B29C 65/00* (2006.01)
  *B29C 65/48* (2006.01)
  *B29C 65/82* (2006.01)
  *B29C 43/18* (2006.01)
  *B23K 26/352* (2014.01)
  *B29K 705/00* (2006.01)
  *B23K 103/16* (2006.01)

(52) U.S. Cl.
  CPC ........ *B29C 45/14* (2013.01); *B29C 45/14311* (2013.01); *B29C 65/00* (2013.01); *B29C 65/48* (2013.01); *B29C 65/8215* (2013.01); *B29C 65/8253* (2013.01); *B29C 66/0246* (2013.01); *B29C 66/112* (2013.01); *B29C 66/114* (2013.01); *B29C 66/30322* (2013.01); *B29C 66/43441* (2013.01); *B29C 66/73162* (2013.01); *B29C 66/742* (2013.01); *B32B 7/12* (2013.01); *B32B 15/08* (2013.01); *B23K 2103/172* (2018.08); *B29C 65/4815* (2013.01); *B29C 65/4835* (2013.01); *B29C 66/026* (2013.01); *B29C 66/02245* (2013.01); *B29C 66/1122* (2013.01); *B29C 66/71* (2013.01); *B29C 66/721* (2013.01); *B29C 66/7212* (2013.01); *B29C 66/7392* (2013.01); *B29C 66/7394* (2013.01); *B29C 2045/14868* (2013.01); *B29C 2791/009* (2013.01); *B29K 2705/00* (2013.01); *B32B 2250/02* (2013.01); *B32B 2307/538* (2013.01); *B32B 2307/54* (2013.01); *B32B 2605/00* (2013.01)

(58) Field of Classification Search
  USPC .............................................. 428/539.5, 687
  See application file for complete search history.

(56) References Cited

U.S. PATENT DOCUMENTS

| | | | |
|---|---|---|---|
| H788 H * | 6/1990 | Schneider, Jr. ............ | B32B 7/04 216/35 |
| 4,931,125 A | 6/1990 | Volkmann et al. | |
| 4,968,383 A | 11/1990 | Volkmann et al. | |
| 2006/0257624 A1 | 11/2006 | Naritomi et al. | |
| 2007/0031639 A1* | 2/2007 | Hsu .......................... | B05D 5/08 428/141 |
| 2011/0095451 A1 | 4/2011 | Dearing et al. | |
| 2012/0207974 A1 | 8/2012 | Maier et al. | |
| 2012/0207982 A1* | 8/2012 | Aso .................... | B29C 45/0005 428/164 |
| 2013/0075941 A1 | 3/2013 | Chang et al. | |
| 2013/0078423 A1 | 3/2013 | Sutou et al. | |
| 2016/0046050 A1 | 2/2016 | Ikeda et al. | |

FOREIGN PATENT DOCUMENTS

| | | |
|---|---|---|
| CN | 105073376 A | 11/2015 |
| EP | 2 127 865 A1 | 12/2009 |
| EP | 2 979 836 A1 | 2/2016 |
| JP | 62-501427 A | 6/1987 |
| JP | 63-313649 A | 12/1988 |
| JP | 07-001165 A | 1/1995 |
| JP | 10-58117 A | 3/1998 |
| JP | 10-58595 A | 3/1998 |
| JP | 10-294024 A | 11/1998 |
| JP | 3332829 B2 | 10/2002 |
| JP | 2003-129135 A | 5/2003 |
| JP | 2005-059014 A | 3/2005 |
| JP | 4020957 B2 | 12/2007 |
| JP | 2008-087409 A | 4/2008 |
| JP | 4292514 B2 | 7/2009 |
| JP | 2009-532208 A | 9/2009 |
| JP | 2010-167475 A | 8/2010 |
| JP | 2012-041579 A | 3/2012 |
| JP | 2013-052671 A | 3/2013 |
| JP | 2013-071312 A | 4/2013 |
| JP | 2013-71453 A | 4/2013 |
| JP | 2013-111881 A | 6/2013 |
| JP | 2013-173170 A | 9/2013 |
| KR | 10-2012-0115998 A | 10/2012 |
| WO | WO 99/37830 A1 | 7/1999 |
| WO | WO 2007/072603 A1 | 6/2007 |
| WO | WO 2008/114669 A1 | 9/2008 |
| WO | WO 2009/151099 A1 | 12/2009 |
| WO | WO 2011/071061 A1 | 6/2011 |
| WO | WO 2012/090671 A1 | 7/2012 |
| WO | WO 2012/125515 A1 | 9/2012 |
| WO | WO 2013/011769 A1 | 1/2013 |
| WO | WO 2013/068553 A1 | 5/2013 |

OTHER PUBLICATIONS

International Search Report for PCT/JP2014/068855 (4 pgs.).
Supplementary Partial European Search Report for corresponding application No. 14826886.5, dated Mar. 10, 2017 (8 pages).
English Translation of International Preliminary Report on Patentability dated Jan. 19, 2016 (1 page).
English Translation of Written Opinion of the International Searching Authority dated Oct. 21, 2014 (10 pages).
Taiwanese Office Action for corresponding application No. 10620212460, dated Feb. 23, 2017 (8 pages).
Chinese Office Action for corresponding patent application No. 201480040798.0, dated Dec. 30, 2016 (10 pages).
Chinese Office Action for corresponding application No. 201480040798. 0, dated Aug. 30, 2017 (9 pages).
Japanese Office Action from corresponding application No. 2016-067236 dated Aug. 16, 2016 (3 pgs.).
Office Action of Japanese Patent Office issued in Application No. 2015-096241 dated Feb. 23, 2016 (2 pages).
Korean Office Action for corresponding application No. 10-2015-7036542, dated Nov. 21, 2017 (7 pgs).

* cited by examiner (a)　　　　　　　　　(b)

Example 3  SEM micrographs of metal surface

Example 4  SEM micrographs of metal surface

Example 5  SEM micrographs of metal surface

Example 6  SEM micrographs of metal surface

SEM of metal surface (Table 1, Comparative Example 2)

SEM of the cross section of bonding surface

SEM of the cross section of bonding surface

SEM micrographs of the cross section of metal

COMPOSITE MOLDED ARTICLE

FIELD OF THE INVENTION

The present invention relates to a composite molded article comprising a metal molded article and another molded article, such as a resin molded article or another metal molded article.

BACKGROUND OF THE INVENTION

A resin molded article is used as a substitute for a metal from the standpoint of weight reduction of various components, but there is often the case where it is difficult to substitute all the metal components with a resin. In this case, it may be considered that a metal molded article and a resin molded article are bonded and united to produce a novel composite component.

However, a technique capable of bonding and uniting a metal molded article and a resin molded article by an industrially advantageous method with a high bonding strength has not yet been subjected to practical use.

JP-B 4,020,957 describes an invention of a laser processing method of a metal surface for bonding with another material (resin) comprising a step of laser scanning the metal surface in one scanning direction, and a step of laser scanning in a scanning direction crossing the same.

JP-A 2010-167475 describes an invention of a laser processing method of the invention of JP-B 4,020,957, in which the laser scanning is performed plural times in a superimposed manner.

However, in the inventions of JP-B 4,020,957 and JP-A 2010-167475, the laser scanning is necessarily performed in two directions crossing each other, and thus there is room for improvement in such a point that the processing time required is too long.

Furthermore, it is considered that the laser scanning in the crossing directions may sufficiently roughen the surface to enhance the bonding strength, but there is a problem that the surface roughness state may not be uniform, and thus the directionality of the strength of the bonding portion of the metal and resin may be unstable.

For example, there may be a problem that one of the bonded articles has the highest shearing force or tensile strength in the X-axis direction, but another one of the bonded articles has the highest shearing force or tensile strength in the Y-axis direction, which is different from the X-axis direction, and still another one of the bonded articles has the highest shearing force or tensile strength in the Z-axis direction, which is different from the X-axis and Y-axis directions.

There is a case where such a resin-metal composite article that has a high bonding strength in a particular direction is demanded depending on the product (for example, a rotating member in one direction and a reciprocating member in one direction), but the inventions of JP-B 4,020,957 and JP-A 2010-167475 may not sufficiently meet the demand.

In the case where the bonding surface has a complicated shape or a shape containing a narrow portion (for example, a star shape, a triangular shape and a dumbbell shape), such a case may be considered that the laser scanning method in the crossing directions partially roughens the surface to make the surface-roughening treatment non-uniform, and as a result a sufficient bonding strength is not obtained.

JP-A 10-294024 describes a production method of an electric or electronic component by forming an unevenness on a metal surface by irradiation with a laser light, and a resin, rubber or the like is injection-molded on the portion having the unevenness formed thereon.

The embodiments 1 to 3 describe the formation of the unevenness on a surface of a metal long coil by laser irradiation. The paragraph No. 10 describes that the surface of the metal long coil is surface-roughened in a stripe form or a satin finish, and the paragraph No. 19 describes that the surface of the metal long coil is surface-roughened in a stripe form, a broken line form, a wavy line form, a knurl form or a satin finish.

However, as described in the effect of the invention in the paragraphs Nos. 21 and 22, the purpose of the laser irradiation is to form fine and irregular unevenness on a metal surface, thereby enhancing the anchoring effect. In particular, the target to be treated is a metal long coil, and therefore it is considered that fine and irregular unevenness is necessarily formed in all the cases of forming any type of unevenness.

Accordingly, the invention of JP-A 10-294024 describes the same technical concept as the invention of forming a fine unevenness on a surface by laser irradiation in the crossing directions as in the inventions of JP-B 4,020,957 and JP-A 2010-167475.

WO-A 2012/090671 relates to an invention of a production method of a composite molded article formed of a metal molded article and a resin molded article. The invention has a step of forming marks containing straight lines and/or curved lines on a bonding surface of a metal molded article in the same direction or different directions by laser scanning, in which the laser scanning is performed in such a manner that the marks each formed of straight lines and/or curved lines do not cross each other. FIGS. 6 to 9 show the marking patterns in a quadrangular shape, a circular shape, an elliptical shape and a triangular shape.

SUMMARY OF THE INVENTION

An ordinary composite molded article formed of a metal molded article and a resin molded article has a largely decreased tensile strength when pulling in the direction perpendicular to the bonding surface of the metal molded article and the resin molded article, as compared to the tensile strength when pulling in the direction in parallel to the bonding surface of the metal molded article and the resin molded article.

A first object of the present invention is to provide a composite molded article that is excellent in both the tensile strength when pulling in a direction in parallel to the bonding surface of a metal molded article as a first molded article and a second molded article (which is a molded article formed of a constitutional material that is different from the metal molded article as the first molded article) and the tensile strength when pulling in a direction perpendicular to the bonding surface of the metal molded article and the resin molded article.

A second object of the present invention is to provide a composite molded article that is excellent in both the tensile strength when pulling in a direction parallel to the bonding surface of a metal molded article and a resin molded article and the tensile strength when pulling in a direction perpendicular to the bonding surface of the metal molded article and the resin molded article.

A third object of the present invention is to provide a composite molded article that contains a metal molded article and a resin molded article bonded through an adhesive layer, and a fourth object of the present invention is to provide a composite molded article that is formed of two metal molded articles each formed of metals having different melting points.

The present invention provides, as one solution to the first object, a composite molded article containing a metal molded article as a first molded article and a second molded article (which is a molded article formed of a constitutional material that is different from the metal molded article as the first molded article), which are bonded to each other, the metal molded article having a roughened bonding surface, a surface layer portion of the metal molded article including the roughened bonding surface having:

open holes containing: a stem hole that is formed in a thickness direction and has an opening on the side of the bonding surface, and a branch hole that is formed from an inner wall of the stem hole in a different direction from the stem hole, the composite molded article comprising such a bonding state that a constitutional material of the second molded article permeates into the open holes formed on the bonding surface of the metal molded article.

The present invention provides, as one solution to the second object, a composite molded article containing a metal molded article and a resin molded article, which are bonded to each other, the metal molded article having a roughened bonding surface, a surface layer portion of the metal molded article including the roughened bonding surface having:

open holes containing: a stem hole that is formed in a thickness direction and has an opening on the side of the bonding surface, and a branch hole that is formed from an inner wall of the stem hole in a different direction from the stem hole, the composite molded article comprising such a bonding state that a resin permeates into the open holes formed on the bonding surface of the metal molded article.

The present invention provides, as one solution to the third object, a composite molded article containing a metal molded article and a resin molded article or a metal molded article (i.e., a second molded article), which are bonded to each other through an adhesive layer, the metal molded article having a roughened bonding surface, a surface layer portion of the metal molded article including the roughened bonding surface having:

open holes containing: a stem hole that is formed in a thickness direction and has an opening on the side of the bonding surface, and a branch hole that is formed from an inner wall of the stem hole in a different direction from the stem hole, the composite molded article comprising the metal molded article and the resin molded article or the metal molded article (i.e., the second molded article), which are bonded through the adhesive layer that is formed on the bonding surface of the metal molded article and is formed in such a state that an adhesive permeates into the open holes.

The present invention provides, as one solution to the fourth object, a composite molded article containing a first metal molded article and a second metal molded article formed of a metal with a melting point lower than that of the first metal molded article, which are bonded to each other, the first metal molded article having a roughened bonding surface, a surface layer portion of the first metal molded article including the roughened bonding surface having:

open holes containing: a stem hole that is formed in a thickness direction and has an opening on the side of the bonding surface, and a branch hole that is formed from an inner wall of the stem hole in a different direction from the stem hole, the composite molded article comprising such a bonding state that the metal forming the second metal molded article permeates into the open holes formed on the bonding surface of the first metal molded article.

The present invention provides, as another solution to the second object, a composite molded article comprising a metal molded article and a resin molded article, which are bonded to each other, the metal molded article having a roughened bonding surface, a surface layer portion of the metal molded article including the roughened bonding surface having:

open holes containing: a stem hole that is formed in a thickness direction and has an opening on the side of the bonding surface, and a branch hole that is formed from an inner wall of the stem hole in a different direction from the stem hole, an internal space that is formed in a thickness direction and has no opening on the side of the bonding surface, and a tunnel connecting channel that connects the open holes and the internal space, the composite molded article comprising such a bonding state that a resin permeates into each of the open holes formed on the bonding surface, the connecting channel, and the internal space of the metal molded article.

The present invention provides, as another solution to the third object, a composite molded article comprising a metal molded article and a resin molded article or a metal molded article (i.e., a second molded article), which are bonded to each other through an adhesive layer, the metal molded article having a roughened bonding surface, a surface layer portion of the metal molded article including the roughened bonding surface having:

open holes containing: a stem hole that is formed in a thickness direction and has an opening on the side of the bonding surface, and a branch hole that is formed from an inner wall of the stem hole in a different direction from the stem hole, an internal space that is formed in a thickness direction and has no opening on the side of the bonding surface, and a tunnel connecting channel that connects the open holes and the internal space, the composite molded article comprising the metal molded article and the resin molded article or the metal molded article (i.e., the second molded article), which are bonded through the adhesive layer that is formed on the bonding surface of the metal molded article and is formed in such a state that a resin permeates into each of the open holes, the connecting channel, and the internal space.

The present invention provides, as another solution to the fourth object, a composite molded article comprising a first metal molded article and a second metal molded article formed of a metal with a melting point lower than that of the first metal molded article, which are bonded to each other, the first metal molded article having a roughened bonding surface, a surface layer portion of the first metal molded article including the roughened bonding surface having:

open holes containing: a stem hole that is formed in a thickness direction and has an opening on the side of the bonding surface, and a branch hole that is formed from an inner wall of the stem hole in a different direction from the stem hole, an internal space that is formed in a thickness direction and has no opening on the side of the bonding surface, and a tunnel connecting channel that connects the open holes and the internal space, the composite molded article being bonded in such a state that the metal forming the second metal molded article permeates into each of the open holes formed on the bonding surface, the connecting channel, and the internal space of the first metal molded article.

The composite molded article of the present invention is excellent in both the tensile strength when pulling in a direction parallel to the bonding surface of the metal molded article and the resin molded article, another metal molded article or the like, and the tensile strength when pulling in a direction perpendicular to the bonding surface of the metal molded article and the resin molded article.

DETAILED DESCRIPTION OF THE INVENTION

The composite molded article of the present invention is a composite molded article comprising two molded articles, which are bonded to each other, and is a molded article in which one of the molded articles (first molded article) is a metal molded article and the other molded article (second molded article) to be bonded is a molded article formed of a constitutional material that is different from the metal molded article.

In the composite molded article of the present invention, plural second molded articles may be bonded to one metal molded article (first molded article), and in this case, the plural second molded articles used may be formed of different constitutional materials.

In the composite molded article of the present invention, plural metal molded articles (first molded articles) may be bonded to one second molded article, and in this case, the plural metal molded articles (first molded articles) may be formed of different metals.

The composite molded article of the present invention has a feature that the bonding surface of the metal molded article as the first molded article is roughened into the particular state (i.e., having open holes (including a stem hole or a branch hole) and the like), and the constitutional material of the second molded article permeates into the open holes (including a stem hole or a branch hole) and the like formed on the bonding surface, thereby bonding the first molded article and the second molded article with a high bonding strength.

The molded article (second molded article) formed of a constitutional material that is different from the metal molded article may be any one that is capable of permeating into the interior of the open holes and the like on the bonding surface and then being cured, and examples thereof include a resin, rubber, an elastomer, and a metal that is different from the metal of the first molded article.

<Composite Molded Article Formed of Metal Molded Article and Resin Molded Article (Containing No Adhesive Layer)>

Figure 1:
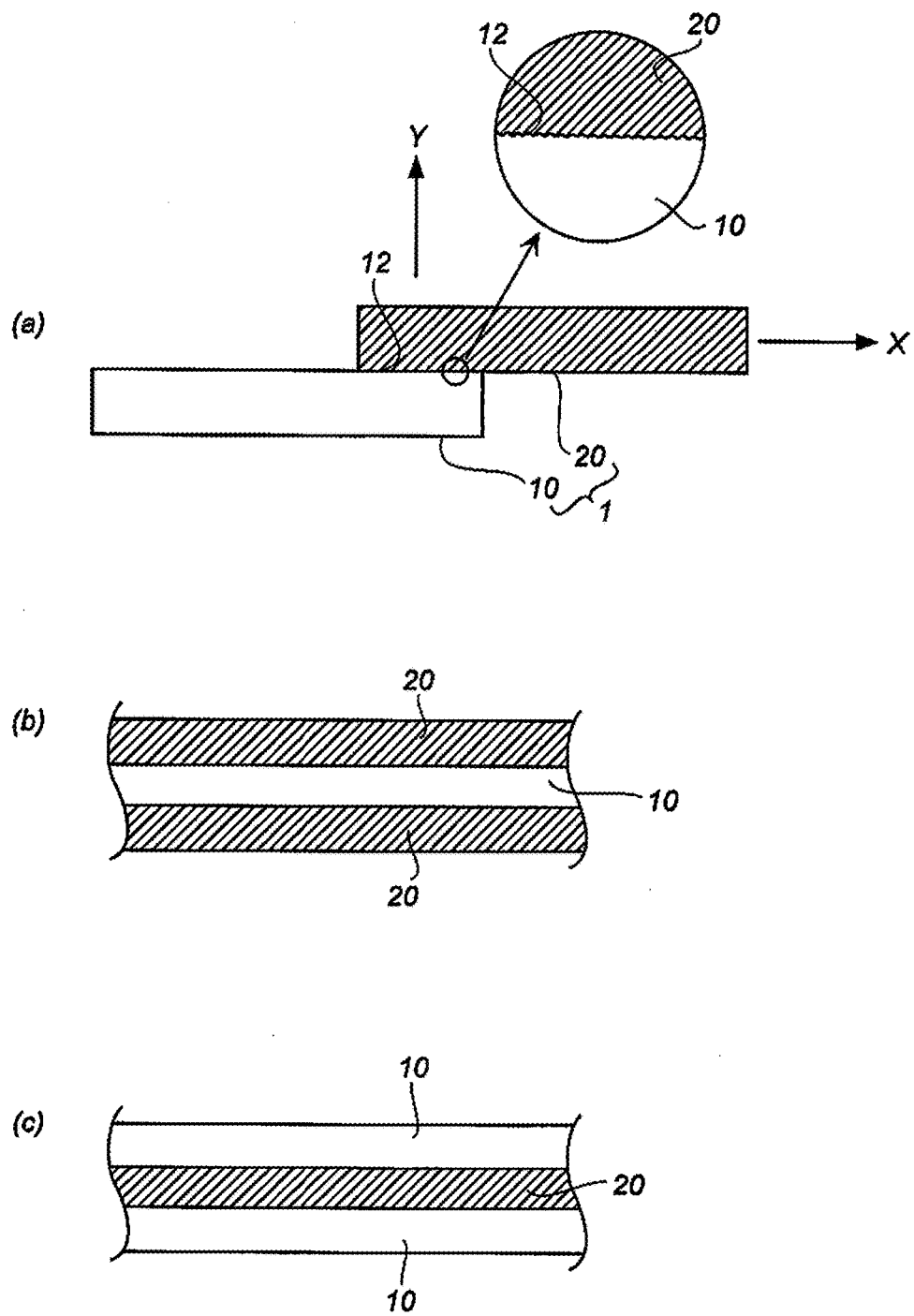
FIG. 1(a) is a cross-sectional view in the thickness direction (including a partial enlarged view) of a composite molded article of the present invention.
FIG. 1(b) is a cross-sectional view in the thickness direction of a composite molded article of another embodiment of the present invention.
FIG. 1(c) is a cross-sectional view in the thickness direction of a composite molded article of still another embodiment of the present invention.
Figure 2:
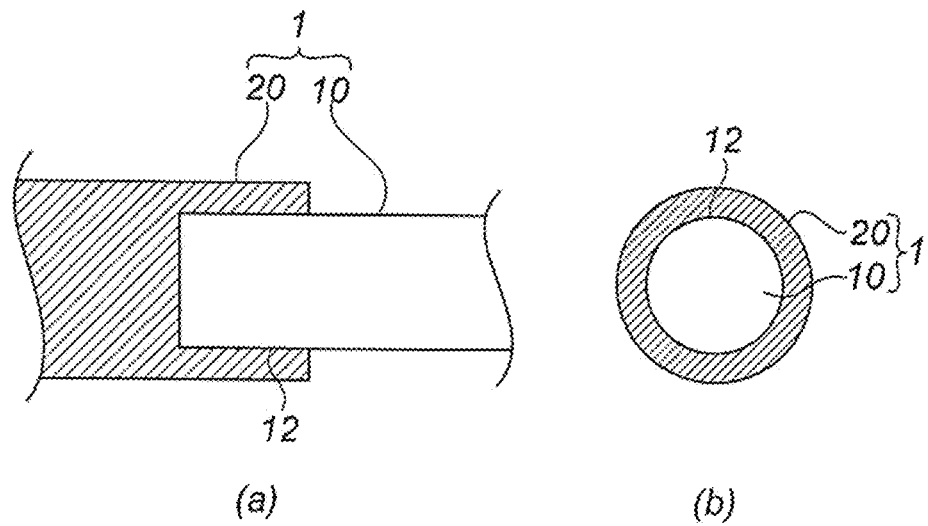
FIG. 2 is cross-sectional views in the thickness direction of a composite molded article of still another embodiment of the present invention.

As shown in FIG. 1(a) or FIG. 2, the composite molded article 1 of the present invention comprises a metal molded article 10 and a resin molded article 20, which are bonded to each other at a roughened bonding surface 12 of the metal molded article 10.

As shown in FIG. 1(b), the composite molded article 1 may be formed such that two resin molded articles 20 are bonded to two surfaces, respectively, of one metal molded article 10. The two resin molded articles 20 may be formed of the same resin or different resins.

As shown in FIG. 1(c), the composite molded article 1 may be formed such that one resin molded article 20 is bonded between two metal molded articles 10. The two metal molded articles 10 may be formed of the same metal or different metals.

The state of the cross-section of the surface layer portion of the metal molded article 10 including the roughened bonding surface 12 will be described below with reference to FIGS. 3, 4 and 5.

Figure 3:
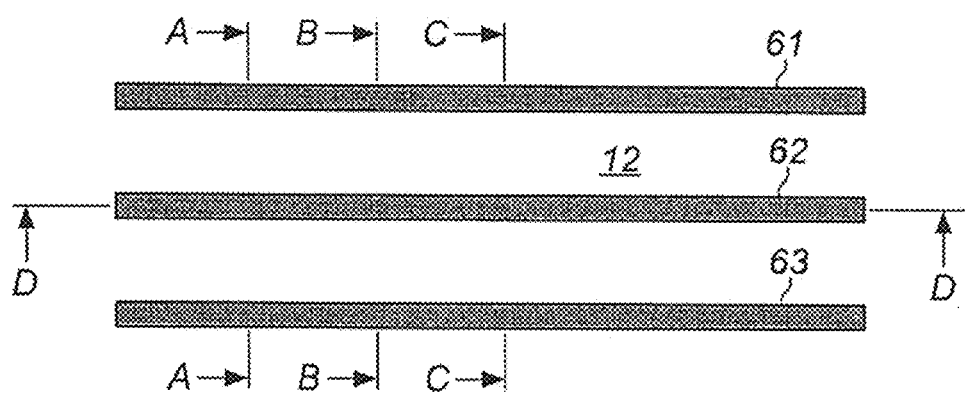
FIG. 3 is an illustrative diagram of a surface-roughening method.

FIG. 3 shows the state of the bonding surface 12 that is roughened by forming a large number of lines (three lines 61 to 63 are shown in the figure with an interval between the lines of approximately 50 μm). The surface layer portion of the metal molded article 10 herein means the portion from the surface to the depth, in which open holes (such as a stem hole or a branch hole) are formed by surface-roughening, and may be a depth in a range of approximately from 50 to 500 μm.

Figure 4:
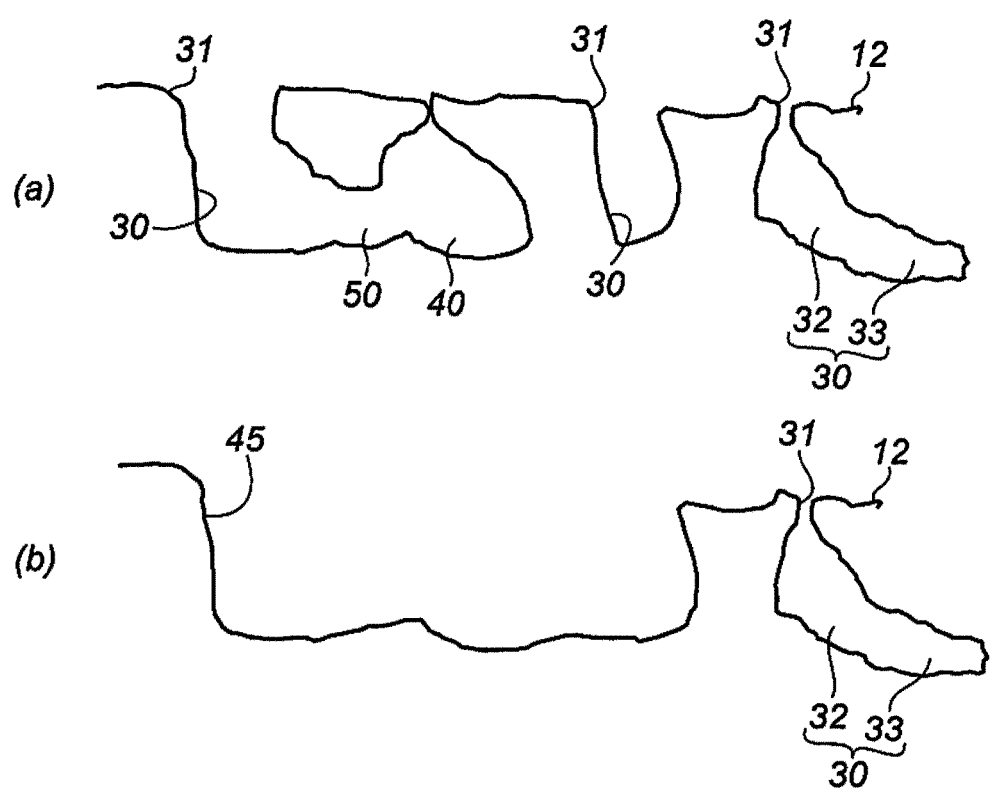
FIG. 4(a) is a cross-sectional view on the line D-D in FIG. 3 viewed in the direction shown by the arrow.
FIG. 4(b) is a cross-sectional view of another embodiment on the line D-D in FIG. 3 viewed in the direction shown by the arrow.
Figure 5:
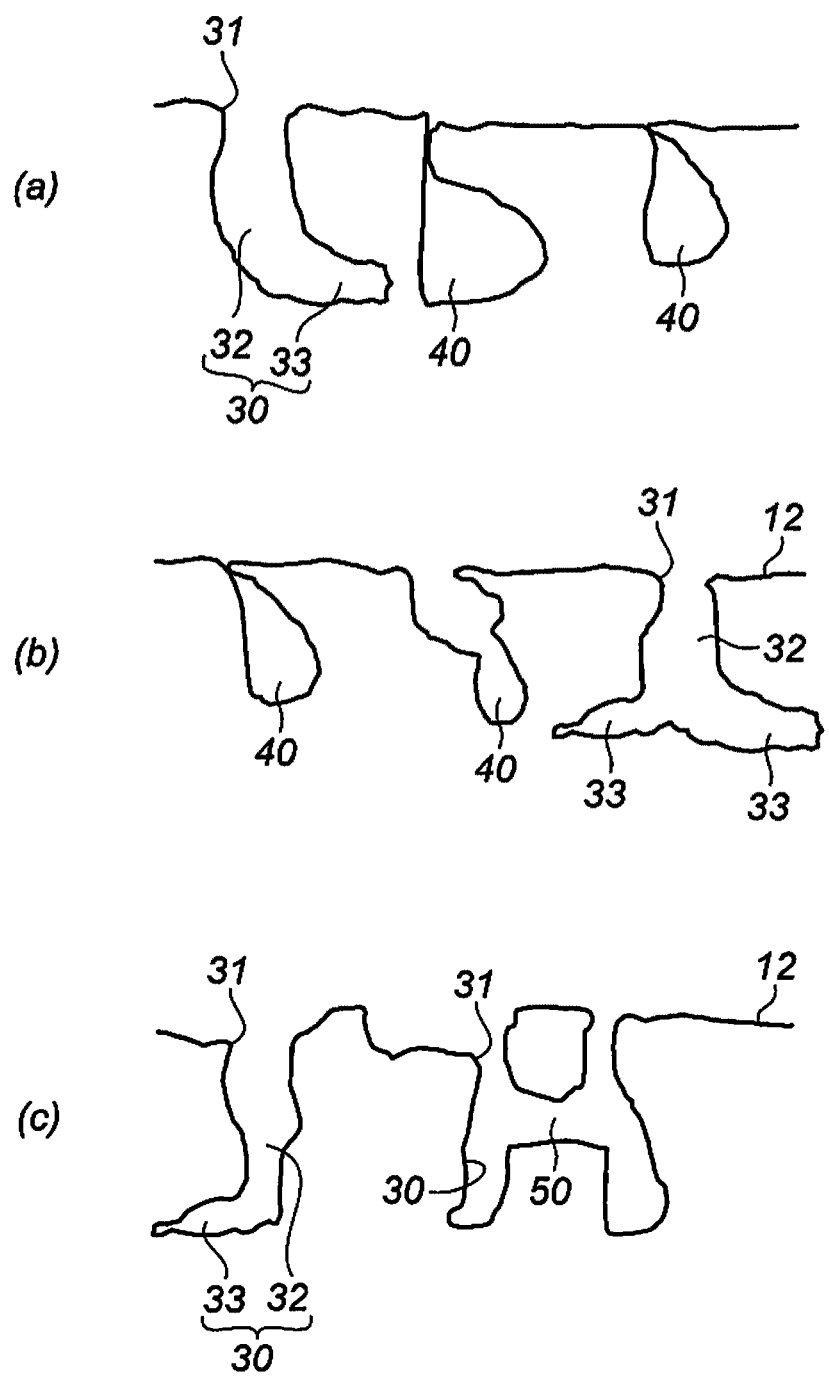
FIG. 5(a) is a cross-sectional view on the line A-A in FIG. 3 viewed in the direction shown by the arrow.
FIG. 5(b) is a cross-sectional view on the line B-B in FIG. 3 viewed in the direction shown by the arrow.
FIG. 5(c) is a cross-sectional view on the line C-C in FIG. 3 viewed in the direction shown by the arrow.

The surface layer portion of the metal molded article 10 including the roughened bonding surface 12 has open holes 30 each having an opening 31 on the side of the bonding surface 12, as shown in FIGS. 4 and 5.

The open holes 30 include a stem hole 32 that is formed in the thickness direction and has an opening 31, and a branch hole 33 that is formed from the inner wall of the stem hole 32 in a different direction from the stem hole 32. Only one branch hole 33 may be formed, and plural branch holes 33 may be formed.

In the composite molded article 1, a part of the open holes 30 may be formed only of the stem hole 32 and have no branch hole 33, as far as the bonding strength of the metal molded article 10 and the resin molded article 20 is retained.

As shown in FIGS. 4 and 5, the surface layer portion of the metal molded article 10 including the roughened bonding surface 12 has an internal space 40 that has no opening on the side of the bonding surface 12.

The internal space 40 is connected to the open hole 30 through a tunnel connecting channel 50.

The surface layer portion of the metal molded article 10 including the roughened bonding surface 12 may have an open space 45 formed of plural open holes 30 united, as shown in FIG. 4(b), and the open space 45 may be formed of an open hole 30 and an internal space 40 united. One open space 45 has a larger internal capacity than one open hole 30.

Many open holes 30 may be united to form an open space 45 in a groove form.

While not shown in the figures, two internal spaces 40 as shown in FIG. 5(a) may be connected to each other through a tunnel connecting channel 50, and an open space 45 as shown in FIG. 4(b) may be connected to an open hole 30, an internal space 40 and another open space 45 through a tunnel connecting channel 50.

All the internal spaces 40 may be connected to one or both of the open hole 30 and the open space 45 through the tunnel connecting channel 50, but a part of the internal spaces 40 may not be connected to the open hole 30 and the open space 45 and thus is in the form of a closed space, as far as the bonding strength of the metal molded article 10 and the resin molded article 20 of the composite molded article 1 can be retained.

The composite molded article 1 of the present invention is united in such a state that the resin forming the resin molded article 20 permeates into the open holes 30, the internal space 40, the tunnel connecting channel 50 and the open space 45 of the metal molded article 10.

Into the interior portions of the open holes 30 (including the stem hole 32 and the branch hole 33) and the open space 45, the resin permeates through each of the openings thereof, and into the interior portion of the internal space 40, the resin having permeated through the openings of the open holes 30 and the open space 45 permeates through the tunnel connecting channel 50.

Accordingly, as compared to a composite molded article having a resin that permeates only into open holes 30 and an open space 45, the composite molded article 1 of the present invention has both an increased tensile strength (S1) when pulling the resin molded article 20 from the metal molded article 10 with the end portion thereof being fixed, in a direction that is in parallel to the bonding surface 12 of the metal molded article 10 and the resin molded article 20 in FIG. 1 (the X direction in FIG. 1), and an increased tensile strength (S2) when pulling the resin molded article 20 in a direction that is perpendicular to the bonding surface 12 of the metal molded article 10 and the resin molded article 20 (the Y direction in FIG. 1).

S1 and S2 may be appropriately controlled by controlling the formation density and the depth of the open holes 30 and the open space 45 and simultaneously controlling the formation density of the internal space 40 and the tunnel connecting channel 50.

The production method of the composite molded article 1 of the present invention will be described.

The composite molded article 1 of the present invention may be produced by a production method comprising a step of surface-roughening the bonding surface 12 of the metal molded article 10, and a step of uniting the metal molded article 10 and the resin molded article 20.

In the surface-roughening step, the bonding surface 12 of the metal molded article 10 is continuously irradiated with laser light by using a continuous wave laser at an irradiation speed of 2,000 mm/sec or more.

In this step, the bonding surface 12 is continuously irradiated with laser light at a high irradiation speed, and thereby the bonding surface 12 can be roughened within a considerably short period of time. In FIG. 1 (partially-enlarged view), the roughened bonding surface 12 is shown in an exaggerated manner.

The irradiation speed of the continuous wave laser is preferably from 2,000 to 20,000 mm/sec, more preferably from 5,000 to 20,000 mm/sec, and further preferably from 8,000 to 20,000 mm/sec.

When the irradiation speed of the continuous wave laser is in this range, the processing speed can be enhanced (i.e., the processing time can be reduced), and the bonding strength can also be retained at a high level.

In this step, the laser light is preferably continuously irradiated in such a manner that the processing time under the following requirements (A) and (B) is in a range of from 0.01 to 30 seconds.

(A) The irradiation speed of the laser light is from 5,000 to 20,000 mm/sec.

(B) The bonding surface of the metal molded article has an area of 100 mm$^2$.

When the processing time under the following requirements (A) and (B) is in this range, the entire surface of the bonding surface 12 can be a roughened surface (can be roughened).

Examples of the method for performing the continuous irradiation of laser light include the following methods, but the method is not particularly limited as far as the bonding surface 12 can be roughened.

Figure 6:
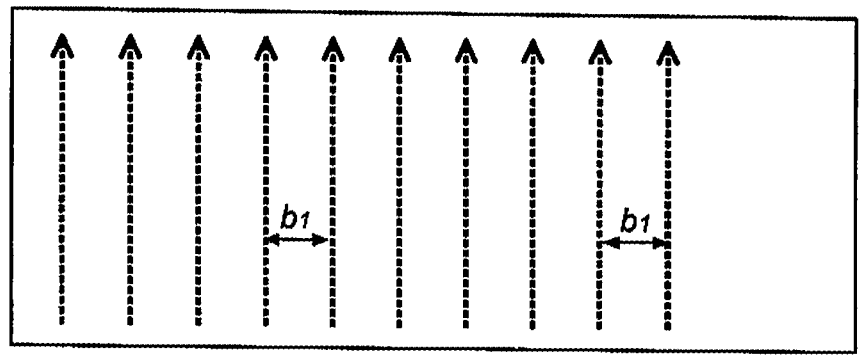
FIG. 6 is an illustrative diagram of a continuous irradiation pattern of laser light.
Figure 7:
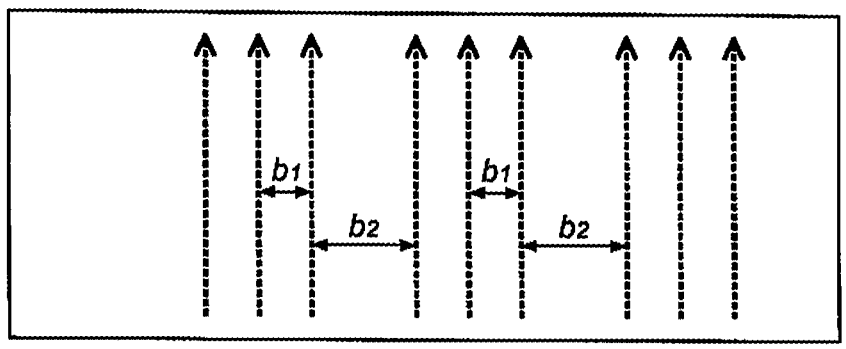
FIG. 7 is an illustrative diagram of a continuous irradiation pattern of laser light of another embodiment.

(I) As shown in FIGS. 6 and 7, the continuous irradiation is performed to form one straight line or curved line from one edge (e.g., the short edge or the long edge) of the bonding surface 12 (which is in a rectangular shape, for example) toward the opposite edge, and the operation is repeated to form plural straight lines or curved lines.

(II) The continuous irradiation is performed to form a straight line or a curved line from one edge to the opposite edge of the bonding surface, and the continuous irradiation is then performed in the reverse direction to form a straight line or a curved line with a certain interval repeatedly.

(III) The continuous irradiation is performed from one edge to the opposite edge of the bonding surface, and then the continuous irradiation is then performed in the perpendicular direction.

(IV) The continuous irradiation is performed randomly with respect to the bonding surface.

In the practice of the methods (I) to (IV), the laser light may be irradiated plural times to form one straight line or one curved line.

Assuming the same continuous irradiation condition, the extent of the surface-roughening of the bonding surface 12 is increased by increasing the number of irradiation (i.e., the repetition number) for forming one straight line or one curved line.

In the case where plural straight lines or plural curved lines are formed in the methods (I) and (II), the laser light may be continuously irradiated to form the straight lines or the curved lines with a regular interval in a range of from 0.005 to 1 mm (i.e., the interval b1 shown in FIG. 6).

The interval in this case is made larger than the beam diameter (spot diameter) of the laser light.

The number of straight lines or curved lines in this case may be controlled corresponding to the area of the bonding surface of the metal molded article 10.

In the case where plural straight lines or plural curved lines are formed in the methods (I) and (II), the laser light may be continuously irradiated to form the straight lines or the curved lines with a regular interval in a range of from 0.005 to 1 mm (i.e., the interval b1 shown in FIGS. 6 and 7).

Assuming that the plural straight lines or the plural curved lines are one group, plural groups may be formed.

The interval of the groups in this case may be a regular interval in a range of from 0.01 to 1 mm (i.e., the interval b2 shown in FIG. 7).

Figure 8:
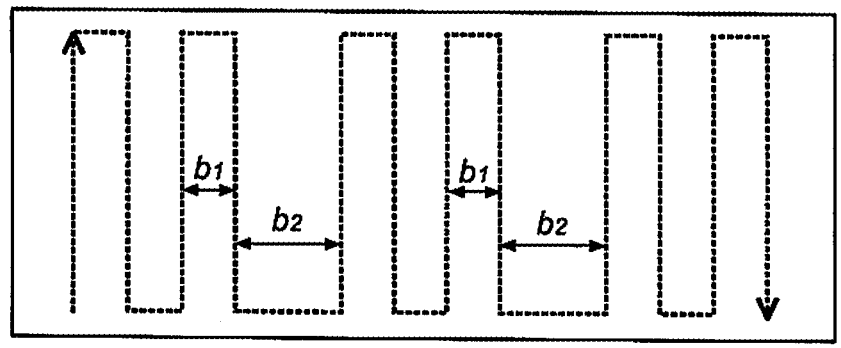
FIG. 8 is an illustrative diagram of a continuous irradiation pattern of laser light of still another embodiment.

Instead of the continuous irradiation methods shown in FIGS. 6 and 7, such a method shown in FIG. 8 may be performed that the continuous irradiation is performed without interruption within the period of from the start of the continuous irradiation to the completion of the continuous irradiation.

The continuous irradiation of the laser light may be performed, for example, under the following conditions.

The output power is preferably from 4 to 4,000 W, more preferably from 50 to 1,000 W, and further preferably 100 to 500 W.

The wavelength is preferably from 300 to 1,200 nm, and more preferably from 500 to 1,200 nm.

The beam diameter (spot diameter) is preferably from 5 to 200 μm, more preferably from 5 to 100 μm, and further preferably from 5 to 50 μm.

The focus position is preferably from −10 to +10 mm, and more preferably from −6 to +6 mm.

The metal of the metal molded article 10 is not particularly limited and may be appropriately selected from known metals depending on the purpose. Examples thereof include ones selected from iron, various kinds of stainless steel, aluminum, zinc, titanium, copper, magnesium, and alloys containing these metals. The metals having been subjected to a surface treatment, such as an alumite treatment and a plating treatment, may be used. The bonding surface 12 of the metal molded article 10 may be a planar surface as shown in FIG. 1, a curved surface as shown in FIG. 2, or a surface having both a planar surface and a curved surface.

The continuous wave laser used may be a known one, and examples thereof include a $YVO_4$ laser, fiber laser (preferably single mode fiber laser), excimer laser, carbon dioxide laser, ultraviolet ray laser, YAG laser, semiconductor laser, glass laser, ruby laser, He—Ne laser, nitrogen laser, chelate laser, and dye laser. Among these, a fiber laser is preferred, and a single mode fiber laser is especially preferred, since the energy density can be increased.

In the subsequent step, the portion of the metal molded article 10 including the roughened bonding surface 12 is united with the resin molded article 20.

In this step, one of the following steps may be performed:
a step of disposing the portion of the metal molded article including the bonding surface having been irradiated with laser light in the preceding step, in a metal mold, and injection-molding a resin to provide the resin molded article, and a step of disposing the portion of the metal molded article including the bonding surface having been irradiated with laser light in the preceding step, in a metal mold, and compression-molding a resin to be the resin molded article while the resin is in contact therewith.

In addition, the known molding methods that have been used as a molding method of a thermoplastic resin and a thermosetting resin may also be employed.

In the case where a thermoplastic resin is used, such a method may be used that a resin permeates into the hole, the groove and the tunnel connecting channel formed in the metal molded article, for example, by applying pressure to the molten resin, and then the resin is solidified by cooling, so as to provide the composite molded article. In addition to the injection molding and the compression molding, such molding methods as injection compression molding may also be employed.

In the case where a thermosetting resin is used, such a method may be used that a resin permeates into the hole, the groove and the tunnel connecting channel formed in the metal molded article, for example, by applying pressure to the resin in a liquid form or in a molten state, and then the resin is cured by heating, so as to provide the composite molded article. In addition to the injection molding and the compression molding, such molding methods as transfer molding may also be employed.

In the case where the compression molding method is used, for example, such a method may be used that the metal molded article 10 is disposed in a mold form in such a state that the bonding surface 12 is exposed in the mold form (i.e., a state that the bonding surface 12 is on the obverse side), and a thermoplastic resin, a thermoplastic elastomer, or a thermosetting resin (which is a prepolymer) is charged thereto, and then compressed.

In the case where a thermosetting resin (which is a prepolymer) is used in an injection molding method and a compression molding method, the resin is heat-cured by heating or the like in the later step.

Examples of the resin of the resin molded article used in this step include a thermoplastic elastomer, in addition to a thermoplastic resin and a thermosetting resin.

The thermoplastic resin may be appropriately selected from known thermoplastic resins depending on the purpose.

Examples thereof include a polyamide resin (such as an aliphatic polyamide, e.g., PA6 and PA66, and an aromatic polyamide), polystyrene, a copolymer containing a styrene unit, such as an ABS resin and an AS resin, polyethylene, a copolymer containing an ethylene unit, polypropylene, a copolymer containing a propylene unit, other polyolefins, polyvinyl chloride, polyvinylidene chloride, a polycarbonate resin, an acrylic resin, a methacrylic resin, a polyester resin, a polyacetal resin, and a polyphenylene sulfide resin.

The thermosetting resin may be appropriately selected from known thermosetting resins depending on the purpose. Examples thereof include a urea resin, a melamine resin, a phenol resin, a resorcinol resin, an epoxy resin, polyurethane, and vinylurethane.

The thermoplastic elastomer may be appropriately selected from known thermoplastic elastomers depending on the purpose. Examples thereof include a styrene elastomer, a vinyl chloride elastomer, an olefin elastomer, a urethane elastomer, a polyester elastomer, a nitrile elastomer, and a polyamide elastomer.

The thermoplastic resin, the thermosetting resin and the thermoplastic elastomer may contain a known fiber filler.

Examples of known fiber fillers include carbon fibers, inorganic fibers, metal fibers, and organic fibers.

The carbon fibers may be known ones, and examples thereof used include PAN series, pitch series, rayon series, and lignin series.

Examples of inorganic fibers include glass fibers, basalt fibers, silica fibers, silica-alumina fibers, zirconia fibers, boron nitride fibers, and silicon nitride fibers.

Examples of metal fibers include fibers formed of stainless steel, aluminum and copper.

Examples of organic fibers used include synthetic fibers, such as polyamide fibers (e.g., wholly aromatic polyamide fibers, semi-aromatic polyamide fibers, in which any one of the diamine and the dicarboxylic acid is an aromatic compound, and an aliphatic polyamide fibers), polyvinyl alcohol fibers, acrylic fibers, polyolefin fibers, polyoxymethylene fibers, polytetrafluoroethylene fibers, polyester fibers (including wholly aromatic polyester fibers), polyphenylene sulfide fibers, polyimide fibers and liquid crystalline polyester fibers, natural fibers (such as cellulose fibers), and regenerated cellulose (rayon) fibers.

The fiber filler used may have a fiber diameter in a range of from 3 to 60 μm, and in particular, for example, a fiber filler having a fiber diameter that is smaller than the opening diameter of the open hole 30 and the like formed through surface roughening of the bonding surface 12 of the metal molded article 10 is preferably used. The fiber diameter is more preferably from 5 to 30 μm, and further preferably from 7 to 20 μm.

The fiber filler having a fiber diameter that is smaller than the opening diameter of the open hole 30 and the like is preferably used since the use thereof may provide the composite molded article, in which a part of the fiber filler permeates into the interior of the open hole 30 and the like of the metal molded article, which results in an enhanced bonding strength of the metal molded article and the resin molded article.

The amount of the fiber filler mixed in 100 parts by mass of the thermoplastic resin, the thermosetting resin or the thermoplastic elastomer is preferably from 5 to 250 parts by mass, more preferably from 25 to 200 parts by mass, and further preferably from 45 to 150 parts by mass.

In the production method of the composite molded article of the present invention, the bonding surface 12 of the metal molded article is continuously irradiated with laser light at an irradiation speed of 2,000 mm/sec or more, and thus the portion having been irradiated with laser light is roughened.

The situation where the surface layer portion of the metal molded article 10 including the roughened bonding surface 12 is in the state shown in FIG. 4 or 5 will be described.

As shown in FIG. 3, many lines (three lines 61 to 63 shown in the figure with an interval of approximately 50 µm) are formed by continuously irradiating with laser light (having, for example, a spot diameter of 11 µm) to achieve surface roughening. The number of irradiation per one straight line is preferably from 1 to 30.

While the detailed mechanism of the formation of the open hole 30, the internal space 40, the open space 45 and the like shown in FIGS. 4 and 5 by continuous irradiation with laser light is still unclear, it is considered that the continuous irradiation of laser light at the prescribed speed or higher once forms holes and grooves on the surface of the metal molded article, but the molten metal rises up and closes or dams them to form the open hole 30, the internal space 40 and the open space 45.

Similarly, while the detailed mechanism of the formation of the branch hole 33 of the open hole 30 and the tunnel connecting channel 50 is still unclear, it is considered that the side wall portions of the holes and grooves once formed are melted by the heat accumulated at the bottom of the holes and grooves, by which the inner wall of the stem hole 32 is melted to form the branch hole 33, and the branch hole 33 is extended to form the tunnel connecting channel 50.

In the case where a pulse laser is used instead of a continuous wave laser, an open hole is formed on the bonding surface of the metal molded article, but a tunnel connecting channel connecting the open holes and an internal space having no opening are not formed.

<Composite Molded Article Formed of Metal Molded Article and Resin Molded Article or Metal Molded Article (Second Molded Article) (Containing Adhesive Layer)>

The production method of the composite molded article containing a metal molded article (i.e., a first molded article) and a resin molded article or a metal molded article as a second molded article, with an adhesive layer intervening therebetween will be described.

In the case where the first molded article and the second molded article each are a metal molded article, the metal molded articles may be formed of the same metal or may be formed of different metals.

In the following description, the production method of the composite molded article comprising a metal molded article and a resin molded article will be described.

In the first step, the bonding surface of the metal molded article is roughened by using a continuous wave laser in the same manner as above.

The surface roughening treatment provides the state shown in FIGS. 4 and 5 of the bonding surface of the metal molded article.

In the subsequent step, an adhesive (adhesive solution) is coated on the roughened bonding surface of the metal molded article. At this time, the adhesive may be pressed therein.

By coating the adhesive, the adhesive permeates into the open hole 30, the internal space 40, the open space 45, the branch hole 33 of the open hole 30, and the tunnel connecting channel 50, and the adhesive overflowing therefrom covers the surface of the bonding surface 12 (outside the open hole 30 and the like).

The adhesive (adhesive solution) preferably has such a viscosity that is capable of facilitating the permeation thereof in the open hole 30 and the like.

In this step, the adhesive may also be coated on the surface of the resin molded article to be bonded to the bonding surface of the metal molded article.

The adhesive is not particularly limited, and known thermoplastic adhesives, thermosetting adhesives and rubber adhesives may be used.

Examples of the thermoplastic adhesives include polyvinyl acetate, polyvinyl alcohol, polyvinyl formal, polyvinyl butyral, an acrylic adhesive, polyethylene, chlorinated polyethylene, an ethylene-vinyl acetate copolymer, an ethylene-vinyl alcohol copolymer, an ethylene-ethyl acrylate copolymer, an ethylene-acrylic acid copolymer, an ionomer, chlorinated polypropylene, polystyrene, polyvinyl chloride, a plastisol, a vinyl chloride-vinyl acetate copolymer, polyvinyl ether, polyvinylpyrrolidone, polyamide, nylon, saturated amorphous polyester, and a cellulose derivative.

Examples of the thermosetting adhesives include a urea resin, a melamine resin, a phenol resin, a resorcinol resin, an epoxy resin, polyurethane, and vinylurethane.

Examples of the rubber adhesives include natural rubber, synthetic polyisoprene, polychloroprene, nitrile rubber, styrene-butadiene rubber, a styrene-butadiene-vinylpyridine terpolymer, polyisobutylene-butyl rubber, polysulfide rubber, RTV silicone, chlorinated rubber, brominated rubber, craft rubber, a block copolymer, and liquid rubber.

In the subsequent step, the resin molded article is adhered to the bonding surface of the metal molded article having the adhesive coated thereon.

According to the treatment in the preceding step, the adhesive permeates into the open hole 30, the internal space 40, the open space 45, the branch hole 33 of the open hole 30, and the tunnel connecting channel 50, and overflows therefrom to cover the surface of the bonding surface 12 (outside the open hole 30 and the like), and thus the anchoring effect by the adhesive is further strongly exhibited.

Therefore, the bonding strength of the composite molded article of the metal molded article and the resin molded article thus produced can be higher than the bonding strength of, for example, a composite molded article that is obtained by bonding a resin molded article to a surface of a metal molded article with an adhesive after subjecting the surface of the metal molded article to a chemical treatment, such as an etching treatment, or a physical treatment, such as a sandblast treatment.

<Composite Molded Article of Metal Molded Articles Having Different Melting Points>

The production method of the composite molded article comprising a first metal molded article having a high melting point and a second metal molded article having a low melting point will be described.

In the first step, the bonding surface of the first metal molded article having a high melting point (such as iron, stainless steel, and other iron alloys) is roughened by using a continuous wave laser in the same manner as above.

The surface roughening treatment provides the state shown in FIGS. 4 and 5 of the bonding surface of the first metal molded article having a high melting point.

In the subsequent step, the first metal molded article having a high melting point is disposed in a metal mold in such a manner that the bonding surface thereof is directed upward.

Thereafter, a metal having a low melting point (for example, aluminum, aluminum alloys, copper, magnesium, and alloys containing the metals) in a molten state is charged in the metal mold, for example, by a known die-casting method.

According to the procedure, the molten metal constituting the second metal molded article permeates into the open hole 30, the internal space 40, the open space 45, the branch hole 33 of the open hole 30, and the tunnel connecting channel 50 of the first metal molded article as shown in FIGS. 4 and 5.

Thereafter, the composite molded article containing the first metal molded article having a high melting point and the second metal molded article having a low melting point is obtained by cooling.

According to the treatment in the preceding step, the molten metal (the metal having a low melting point constituting the second metal molded article) permeates into the open hole 30, the internal space 40, the open space 45, the branch hole 33 of the open hole 30, and the tunnel connecting channel 50, and thus the anchoring effect by the metal permeates into the open hole 30 and the like is further strongly exhibited.

Therefore, the bonding strength of the composite molded article formed of metal molded articles of the first metal molded article and the second metal molded article thus produced can be higher than the bonding strength of a composite molded article of metal molded articles that is obtained by subjecting the surface of the first metal molded article to a chemical treatment, such as an etching treatment, or a physical treatment, such as a sandblast treatment, and then performing a known die-casting method.

The composite molded article containing the first metal molded article having a high melting point and the second metal molded article having a low melting point may be a composite molded article that is in the same bonding state as the metal molded article 10 and the resin molded article 20 shown in FIGS. 1(*a*) to 1(*c*) and FIG. 2.

EXAMPLES

Examples 1 to 6 and Comparative Examples 1 to 3

Figure 9:
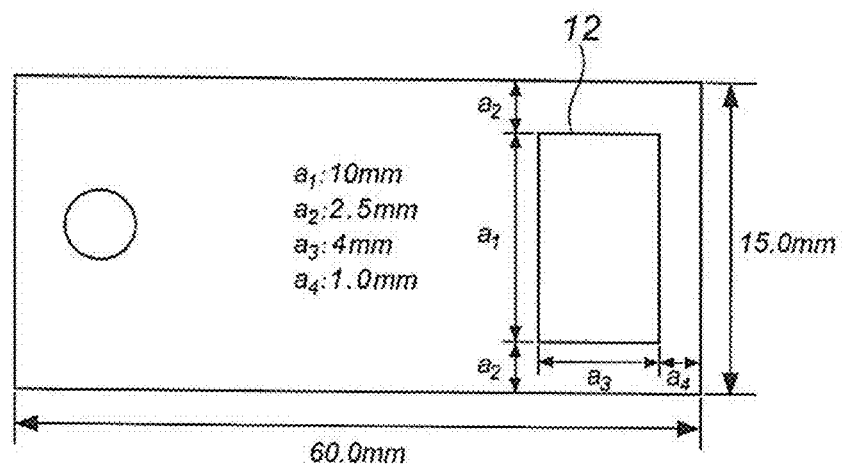
FIG. 9 is an illustrative diagram of a production method of a composite molded article by performing injection molding.

In Examples and Comparative Examples, the entire surface (an area of 40 mm$^2$) of a bonding surface 12 of a metal molded article shown in FIG. 9 (aluminum (A5052), thickness: 1 mm) was continuously irradiated with laser light under the conditions shown in Table 1.

Laser light (single mode fiber laser, SMF laser) was continuously applied as shown in FIG. 6 in Examples 1 to 5 and Comparative Example 1 to 3, and laser light was continuously applied as shown in FIG. 7 in Example 6.

Subsequently, the metal molded articles thus treated were used, and injection molding was performed according to the following manners, thereby providing composite molded articles of Examples and Comparative Examples shown in FIG. 17.

Figure 10:
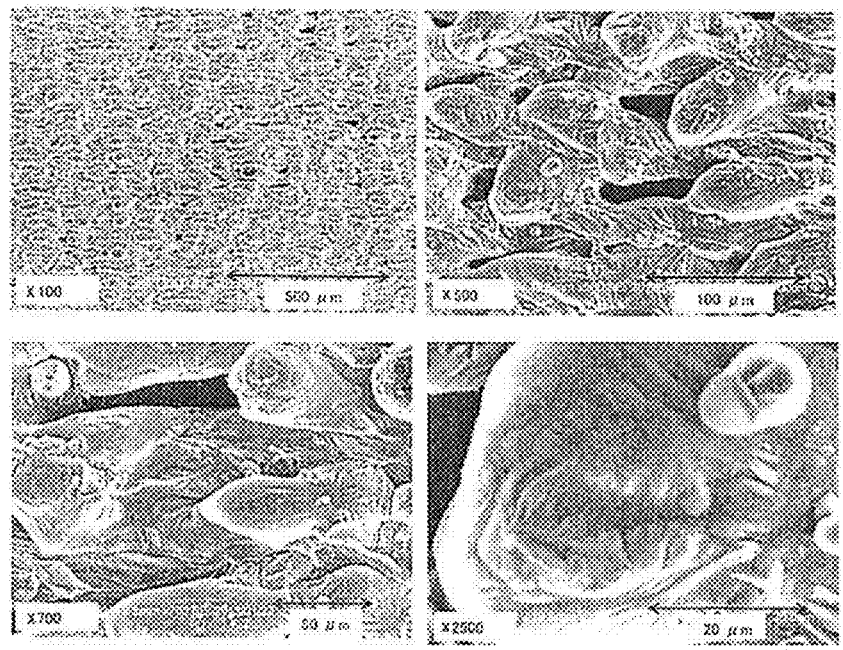
FIG. 10 is SEM micrographs of the surface of the metal molded article after the continuous laser irradiation in Example 1.

FIG. 10 shows SEM micrographs (magnification: 100, 500, 700 and 2,500) of the bonding surface of the metal molded article after the continuous irradiation with a continuous wave laser in Example 1. The bonding surface was roughened, and a state where small depressed portions were formed was confirmed.

Figure 11:
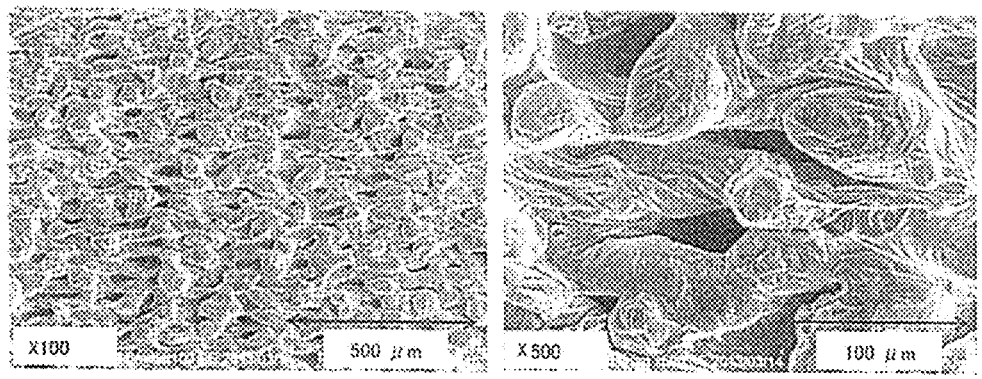
FIG. 11 is SEM micrographs of the bonding surface of the metal molded article after the continuous laser irradiation in Example 2.

FIG. 11 shows SEM micrographs (magnification: 100 and 500) of the bonding surface of the metal molded article after the continuous irradiation with a continuous wave laser in Example 2. The bonding surface was roughened, and a state where small depressed portions were formed was confirmed.

Figure 12:
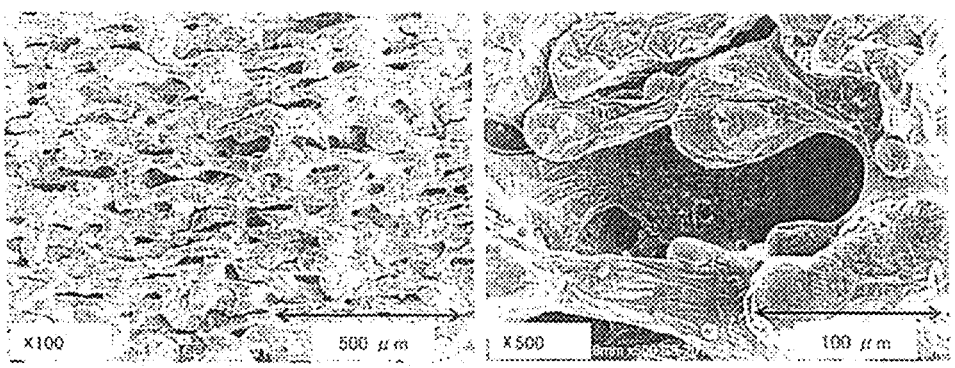
FIG. 12 is SEM micrographs of the bonding surface of the metal molded article after the continuous laser irradiation in Example 3.

FIG. 12 shows SEM micrographs (magnification: 100 and 500) of the bonding surface of the metal molded article after the continuous irradiation with a continuous wave laser in Example 3. The bonding surface was roughened, and a state where small depressed portions were formed was confirmed.

Figure 13:
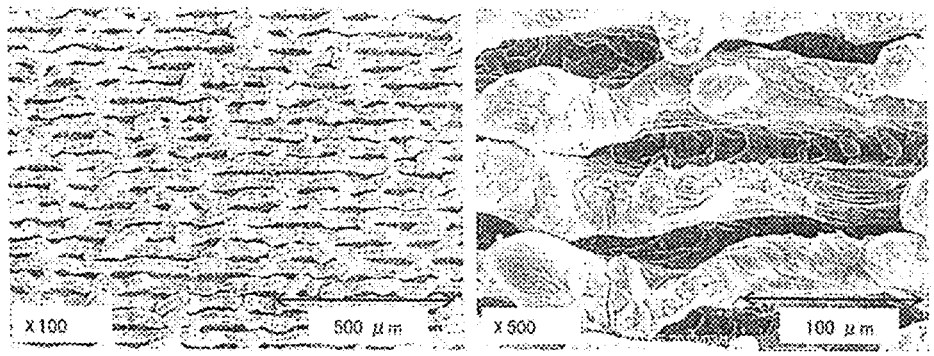
FIG. 13 is SEM micrographs of the bonding surface of the metal molded article after the continuous laser irradiation in Example 4.

FIG. 13 shows SEM micrographs (magnification: 100 and 500) of the bonding surface of the metal molded article after the continuous irradiation with a continuous wave laser in Example 4. The bonding surface was roughened, and a state where small depressed portions were formed was confirmed.

Figure 14:
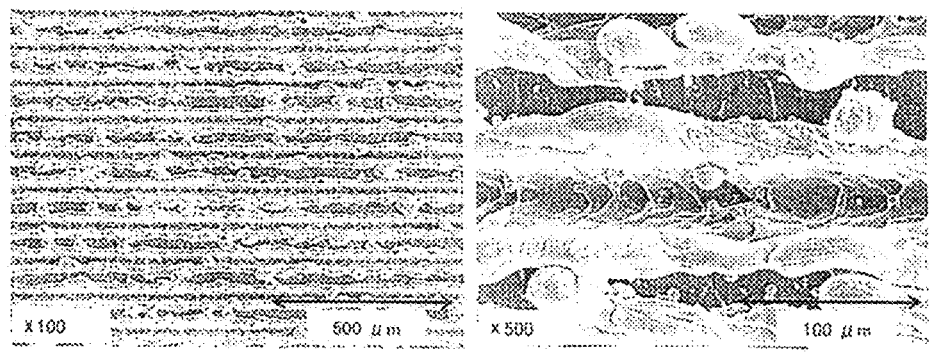
FIG. 14 is SEM micrographs of the bonding surface of the metal molded article after the continuous laser irradiation in Example 5.

FIG. 14 shows SEM micrographs (magnification: 100 and 500) of the bonding surface of the metal molded article after the continuous irradiation with a continuous wave laser in Example 5. The bonding surface was roughened, and a state where small depressed portions were formed was confirmed.

Figure 15:
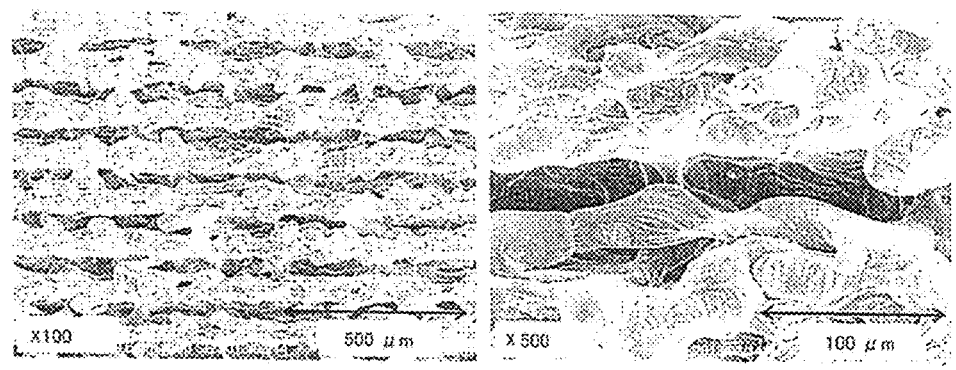
FIG. 15 is SEM micrographs of the bonding surface of the metal molded article after the continuous laser irradiation in Example 6.

FIG. 15 shows SEM micrographs (magnification: 100 and 500) of the bonding surface of the metal molded article after the continuous irradiation with a continuous wave laser in Example 6. The bonding surface was roughened, and a state where small depressed portions were formed was confirmed.

Figure 16:
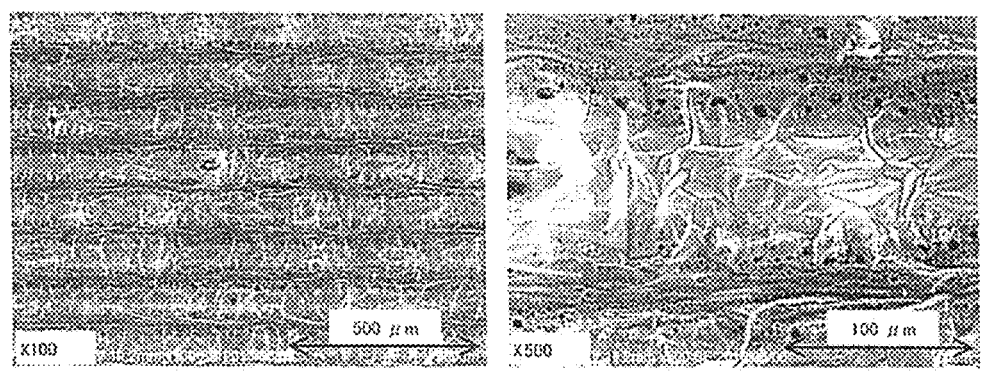
FIG. 16 is SEM micrographs of the bonding surface of the metal molded article after the continuous laser irradiation in Comparative Example 2.

FIG. 16 shows SEM micrographs (magnification: 100 and 500) of the bonding surface of the metal molded article after the continuous irradiation with a continuous wave laser in Comparative Example 2. The bonding surface was not sufficiently roughened since the irradiation speed was 1,000 mm/sec.

<Injection Molding>

Resin: glass fiber (GF) 60%-reinforced PA66 resin (Plastron PA66-GF60-01 (L7), produced by Daicel Polymer Ltd., fiber length of glass fibers: 11 mm)

Resin temperature: 320° C.

Metal mold temperature: 100° C.

Injection molding machine: ROBOSHOT S2000i100B, produced by Fanuc Ltd.

Tensile Test

Figure 17:
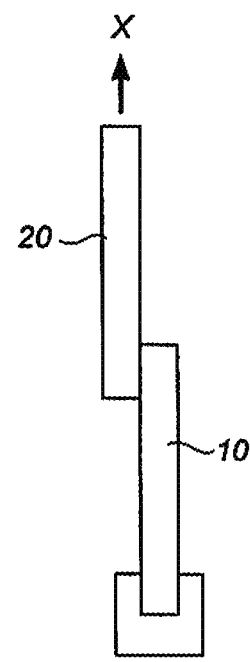
FIG. 17 is an illustrative diagram of a measurement method for measuring the bonding strength on pulling in the direction in parallel to the bonding surface.

The composite molded articles of the Examples and Comparative Examples shown in FIG. 17 were subjected to a tensile test to evaluate the shear bonding strength. The results are shown in Table 1.

In the tensile test, in the state where the end portion of the metal molded article 10 was fixed, the metal molded article 10 and the resin molded article 20 were pulled in the X direction shown in FIG. 17 (i.e., the X direction in FIG. 1, which was parallel to the bonding surface 12) until the molded articles separated, and the maximum load (S1) until the bonding surface 12 was broken was measured.

<Tensile Test Condition>

Test machine: Tensilon, produced by Orientec Co., Ltd. (UCT-1T)

Tensile speed: 5 mm/min

Chuck distance: 50 mm

TABLE 1

|  | Example 1 | Example 2 | Example 3 | Example 4 | Example 5 | Example 6 | Comparative Example 1 | Comparative Example 2 | Comparative Example 3 |
| --- | --- | --- | --- | --- | --- | --- | --- | --- | --- |
| Kind of metal | Al | | | | | | Al | | |
| Kind of resin | PA66 (containing GF) | | | | | | PA66 (containing GF) | | |
| Bonding method | injection molding | | | | | | injection molding | | |
| Laser oscillator | SMF laser | | | | | | | YVO$_4$ laser | SMF laser |

TABLE 1-continued

|  | Example 1 | Example 2 | Example 3 | Example 4 | Example 5 | Example 6 | Comparative Example 1 | Comparative Example 2 | Comparative Example 3 |
|---|---|---|---|---|---|---|---|---|---|
| Waveform | continuous wave | continuous wave | continuous wave | continuous wave | continuous wave | continuous wave | pulse wave | continuous wave | continuous wave |
| Output power (W) | 274 | 274 | 274 | 274 | 274 | 274 | 6 | 274 | 274 |
| Wavelength (nm) | 1,070 | 1,070 | 1,070 | 1,070 | 1,070 | 1,070 | 1,064 | 1,070 | 1,070 |
| Pulse width (nsec) | — | — | — | — | — | — | 30 | — | — |
| Frequency (kHz) | — | — | — | — | — | — | 50 | — | — |
| Spot diameter (μm) | 11 | 11 | 11 | 11 | 11 | 11 | 30 | 11 | 11 |
| Laser irradiation speed (mm/sec) | 10,000 | 10,000 | 10,000 | 13,333 | 13,333 | 13,333 | 500 | 1,000 | 100 |
| Number of lines | 80 | 80 | 80 | 80 | 40 | 99 | 500 | 80 | 80 |
| Line interval (b1) (mm) | 0.05 | 0.05 | 0.05 | 0.05 | 0.1 | 0.03 | 0.008 | 0.05 | 0.05 |
| Line group interval (b2) (mm) | — | — | — | — | — | 0.06 | — | — | — |
| Repetition number | 1 | 3 | 10 | 1 | 1 | 3 | 1 | 1 | 1 |
| Treated area (mm²) | 40 | 40 | 40 | 40 | 40 | 40 | 40 | 40 | 40 |
| Processing time (sec) | 0.4 | 1 | 3 | 0.3 | 0.2 | 1.3 | 20 | 4 | 40 |
| Shear bonding strength (MPa) | 5 | 18 | 25 | 8 | 12 | 29 | 3 | 0 | 0 |

It was confirmed from the comparison between Example 1 and Comparative Example 1 that Example 1 provided a composite molded article having a higher bonding strength with a processing time of 1/50.

In consideration of mass production in an industrial scale, the production method of Example 1 is capable of reducing the processing time (i.e., capable of also reducing the energy required for production) and has a considerably large industrial value.

It was confirmed from the comparison between Example 1 and Examples 2 and 3 that, as shown in Examples 2 and 3, the bonding strength could be increased by increasing the repetition number of the laser irradiation, and even in these cases, the processing time could be reduced as compared to Comparative Examples 1 to 3.

It was confirmed from the comparison between Examples 1 to 3 and Examples 4 to 6 that the bonding strength (i.e., the bonding strength S1 in the X direction in FIGS. 1 and 17) could be increased by increasing the irradiation speed of the laser as in Examples 4 to 6.

Examples 7 to 9 and Comparative Examples 4 to 6

Figure 18:
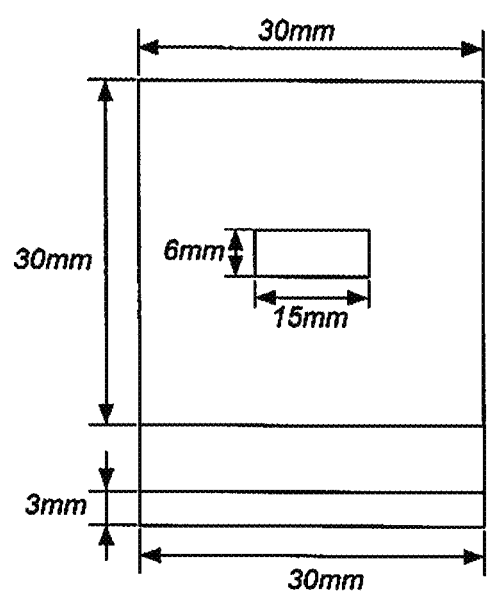
FIG. 18 is an illustrative diagram of a production method of a composite molded article by performing injection molding.

In Examples and Comparative Examples, the entire surface (an area of 90 mm²) of a bonding surface 12 of a metal molded article shown in FIG. 18 (aluminum (A5052), thickness: 3 mm) was continuously irradiated with laser light under the conditions shown in Table 2.

Figure 19:
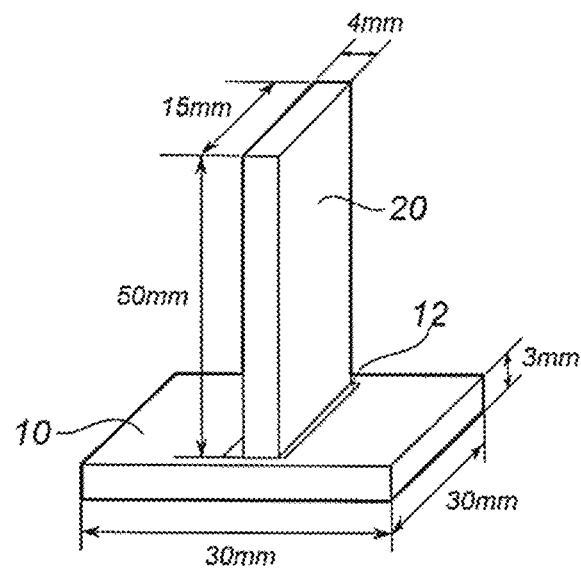
FIG. 19 is a perspective view of a molded article thus produced.

Thereafter, composite molded articles shown in FIG. 19 were obtained in the same manner as in Examples 1 to 6 and Comparative Examples 1 to 3.

The resulting composite molded articles were measured for the tensile bonding strength (S2) corresponding to the Y direction shown in FIG. 1 (i.e., the Y direction in FIG. 20) in the following manner.

Figure 20:
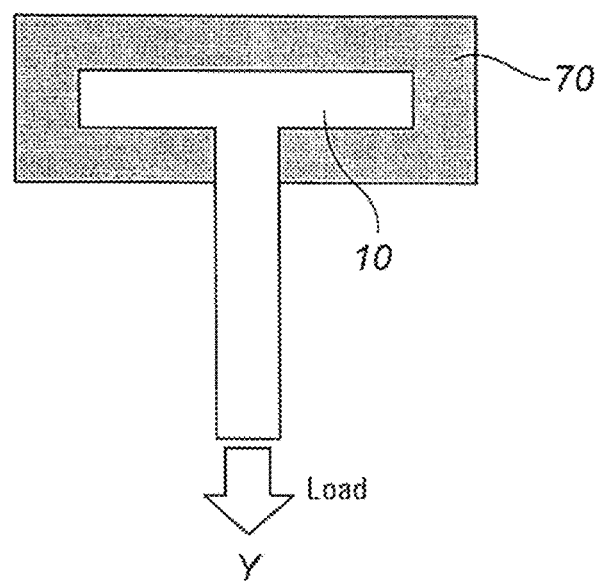
FIG. 20 is an illustrative diagram of a measurement method of the tensile strength of the composite molded article shown in FIG. 19.

In the tensile test, as shown in FIG. 20, in the state where the composite molded article was fixed with a jig 70 on the side of the metal molded article 10, the metal molded article 10 and the resin molded article 20 were pulled in the Y direction shown in FIG. 20 (i.e., the Y direction in FIG. 1, which was perpendicular to the bonding surface 12) until the molded articles separated, and the maximum load (S2) until the bonding surface 12 was broken was measured.

<Tensile Test Condition>
Test machine: Tensilon, produced by Orientec Co., Ltd. (UCT-1T)
Tensile speed: 5 mm/min
Chuck distance: 50 mm

TABLE 2

|  | Example 7 | Example 8 | Example 9 | Comparative Example 4 | Comparative Example 5 | Comparative Example 6 |
|---|---|---|---|---|---|---|
| Kind of metal | Al | | | Al | | |
| Kind of resin | PA66 (containing GF) | | | PA66 (containing GF) | | |
| Bonding method | injection molding | | | injection molding | | |
| Laser oscillator | SMF laser | | | YVO₄ laser | SMF laser | |
| Waveform | continuous wave | continuous wave | continuous wave | pulse wave | continuous wave | continuous wave |
| Output power (W) | 274 | 274 | 274 | 6 | 274 | 274 |
| Wavelength (nm) | 1,070 | 1,070 | 1,070 | 1,064 | 1,070 | 1,070 |
| Pulse width (nsec) | — | — | — | 30 | — | — |
| Frequency (kHz) | — | — | — | 50 | — | — |
| Spot diameter (μm) | 11 | 11 | 11 | 30 | 11 | 11 |
| Laser irradiation speed (mm/sec) | 10,000 | 10,000 | 10,000 | 500 | 1,000 | 100 |
| Number of lines | 120 | 120 | 120 | 750 | 120 | 120 |
| Line interval (b1) (mm) | 0.05 | 0.05 | 0.05 | 0.008 | 0.05 | 0.05 |
| Line group interval (b2) (mm) | — | — | — | — | — | — |
| Repetition number | 1 | 3 | 10 | 1 | 1 | 1 |
| Treated area (mm²) | 90 | 90 | 90 | 90 | 90 | 90 |
| Processing time (sec) | 0.6 | 1.6 | 3 | 30 | 6 | 60 |
| Tensile bonding strength (MPa) | 4 | 14 | 21 | 0 | 0 | 0 |

Examples 7 to 9 (area of bonding surface 12: 90 mm$^2$) in Table 2 corresponded to Examples 1 to 3 (area of bonding surface 12: 40 mm$^2$) in Table 1, and had an area of the bonding surface 12 of 2.25 times.

It was apparent from the comparison to Comparative Examples 4 to 6 in Table 2 that the application of the production method of the present invention also enhanced the tensile strength (S2) on pulling in the direction (Y direction in FIG. 1) perpendicular to the bonding surface 12 (area: 90 mm$^2$) of the metal molded article 10 and the resin molded article 20.

Examples 10 to 15 and Comparative Examples 7 to 9

Figure 21:
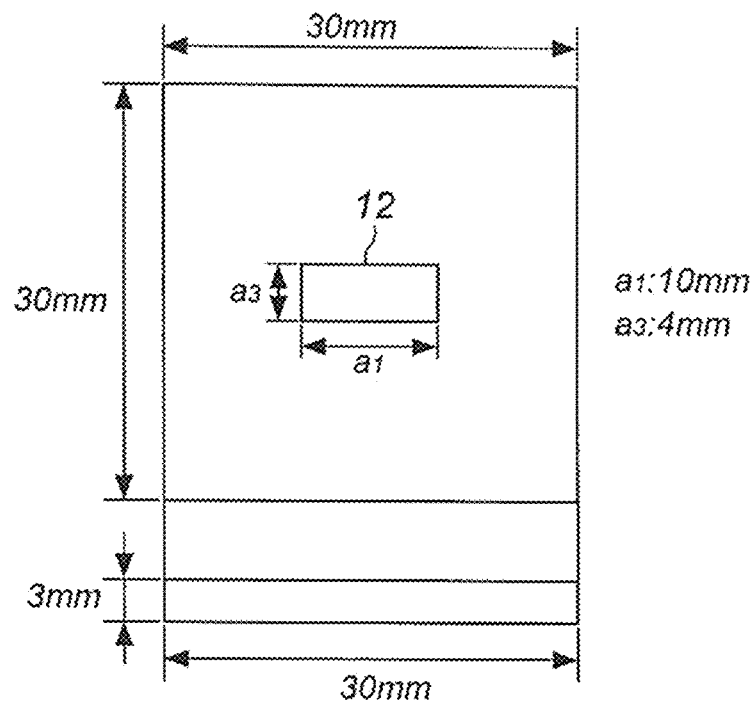
FIG. 21 is an illustrative diagram of a production method of a composite molded article by performing compression molding.

In Examples and Comparative Examples, the entire surface (an area of 40 mm$^2$) of a bonding surface 12 of a metal molded article shown in FIG. 21 (aluminum (A5052), thickness: 3 mm) was continuously irradiated with laser light under the conditions shown in Table 3.

Laser light was continuously applied as shown in FIG. 6 in Examples 10 to 14 and Comparative Example 8 and 9, the laser light was continuously applied as shown in FIG. 7 in Example 15, and the laser light was continuously applied as shown in FIG. 8 in Comparative Example 7.

Subsequently, the metal molded articles thus treated were used, and compression molding was performed according to the following manners, thereby providing composite molded articles of Examples and Comparative Examples.

Compression Molding

Figure 22:
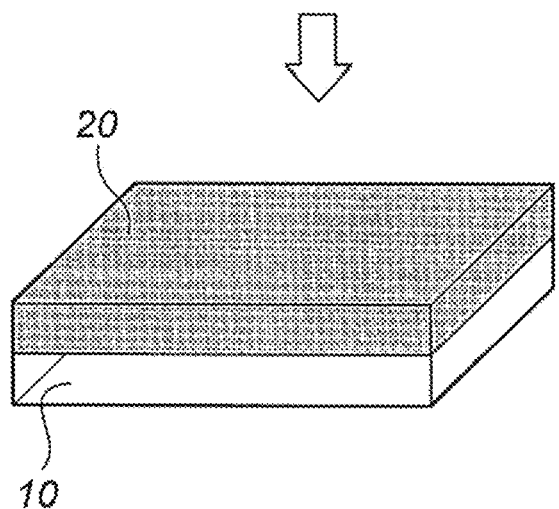
FIG. 22 is a perspective view of a molded article thus produced by compression molding.

The metal molded article 10 was disposed in a mold form (formed of Teflon) with the bonding surface 12 being directed upward, and resin pellets were added onto the bonding surface. Thereafter, the mold form was held between steel plates and compressed under the following condition, thereby providing a composite molded article shown in FIG. 22.

Resin pellets: PA66 resin (2015B, produced by Ube Industries, Ltd.)

Temperature: 285° C.
Pressure: 1 MPa (preheating), 10 MPa
Time: 2 minutes (preheating), 3 minutes
Molding machine: compression molding machine (mini test press-10), produced by Toyo Seiki Seisaku-sho, Ltd.

Tensile Test

The composite molded articles of the Examples and Comparative Examples were subjected to a tensile test to evaluate the tensile bonding strength. The results are shown in Table 3.

Figure 23:
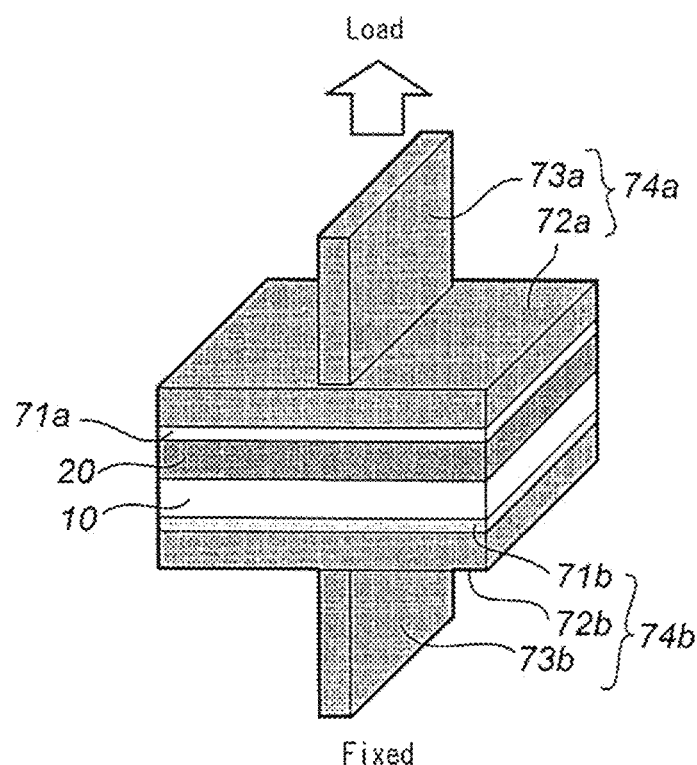
FIG. 23 is an illustrative diagram of a measurement method for measuring the bonding strength when pulling in a direction perpendicular to the bonding surface.

The tensile test was performed in the following manner. As shown in FIG. 23, a jig 74a formed of an aluminum plate 72a having fixed on the surface thereof perpendicular thereto a pulling portion 73a fixed to the exposed surface of the resin molded article 20 of the composite molded article with an adhesive 71a.

As shown in FIG. 23, similarly, a jig 74b formed of an aluminum plate 72b having fixed on the surface thereof perpendicular thereto a fixing portion 73b fixed to the exposed surface of the metal molded article 10 of the composite molded article with an adhesive 71b.

In the state where the fixing portion 73b was fixed, the pulling portion 73a was pulled under the following conditions, and the maximum load (S2) until the bonding surface 12 was broken was measured.

<Tensile Test Condition>
Test machine: Tensilon
Tensile speed: 5 rum/min
Chuck distance: 16 mm Observation Method of Internal Space The presence of an internal space having no opening was confirmed. The method therefor will be described below.

The bonding portion including the bonding surface 12 of the composite molded article was cut at three positions selected randomly in a direction (the directions A-A, B-B and C-C in FIG. 3) perpendicular to the laser irradiation direction, and for each of the surface layer portions, three points selected randomly on the cross sectional surface were observed with a scanning electron microscope (SEM).

In the case where the presence of an internal space was able to be confirmed in the SEM observation micrograph (magnification: 500), the number thereof was counted. An internal space that had a maximum diameter of 10 μm or less was excluded.

The number of internal spaces (which is an average value of the nine points) is shown in Table 3.

The internal space was analyzed by X-ray microanalysis (EDX), and it was confirmed that the resin permeated into the internal space.

SEM: S-3400N, produced by Hitachi High-Technologies Corporation

EDX analyzer: Apollo XP, produced by Ametek, Inc. (former Edax Japan Co., Ltd.)

In the case where the metal surface of the composite molded article is a curved surface as shown in FIG. 2, the similar measurement may be performed by cutting the specimen in a direction perpendicular to the tangent line of the curved surface.

The permeation of the resin in the internal space can also be confirmed by using a microscopic laser Raman spectrophotometer.

TABLE 3

|  | Example 10 | Example 11 | Example 12 | Example 13 | Example 14 | Example 15 | Comparative Example 7 | Comparative Example 8 | Comparative Example 9 |
|---|---|---|---|---|---|---|---|---|---|
| Kind of metal | Al | | | | | | | Al | |
| Kind of resin | PA66 | | | | | | | PA66 | |
| Bonding method | compression molding | | | | | | | compression molding | |
| Laser oscillator | SMF laser | | | | | | | YVO$_4$ laser | |
| Waveform | continuous wave | continuous wave | continuous wave | continuous wave | continuous wave | continuous wave | pulse wave | continuous wave | continuous wave |
| Output power (W) | 274 | 274 | 274 | 274 | 274 | 274 | 30 | 274 | 274 |
| Wavelength (nm) | 1,070 | 1,070 | 1,070 | 1,070 | 1,070 | 1,070 | 1,070 | 1,070 | 1,070 |
| Pulse width (nsec) | — | — | — | — | — | — | 50 | — | — |
| Frequency (kHz) | — | — | — | — | — | — | 30 | — | — |
| Spot diameter (μm) | 11 | 11 | 11 | 11 | 11 | 11 | 45 | 11 | 11 |
| Laser irradiation speed | 10,000 | 10,000 | 10,000 | 13,333 | 13,333 | 13,333 | 500 | 1,000 | 100 |

TABLE 3-continued

|  | Example 10 | Example 11 | Example 12 | Example 13 | Example 14 | Example 15 | Comparative Example 7 | Comparative Example 8 | Comparative Example 9 |
|---|---|---|---|---|---|---|---|---|---|
| (mm/sec) |  |  |  |  |  |  |  |  |  |
| Number of lines | 80 | 80 | 80 | 80 | 40 | 99 | 60 | 80 | 80 |
| Line interval (b1) (mm) | 0.05 | 0.05 | 0.05 | 0.05 | 0.1 | 0.03 | 0.06 | 0.05 | 0.05 |
| Line group interval (b2) (mm) | — | — | — | — | — | 0.06 | 0.09 | — | — |
| Repetition number | 1 | 3 | 10 | 1 | 1 | 3 | 1 | 1 | 1 |
| Treated area (mm$^2$) | 40 | 40 | 40 | 40 | 40 | 40 | 40 | 40 | 40 |
| Processing time (sec) | 0.4 | 1 | 3 | 0.3 | 0.2 | 1.3 | 1.2 | 4 | 40 |
| Number of internal space | 5 | 7 | 6 | 3 | 2 | 3 | 0 | 0 | 0 |
| Tensile bonding strength (MPa) | 19 | 21 | 28 | 18 | 16 | 22 | 1 | 0 | 0 |

In Example 10 to 15, the bonding surface 12 of the metal molded article 10 is continuously irradiated with laser light in the same manner as in Examples 1 to 6, and therefore the surface of the bonding surface 12 of the metal molded article 10 is in the similar condition as in the SEM micrographs (FIGS. 10 to 15) shown in Examples 1 to 6.

Figure 24:
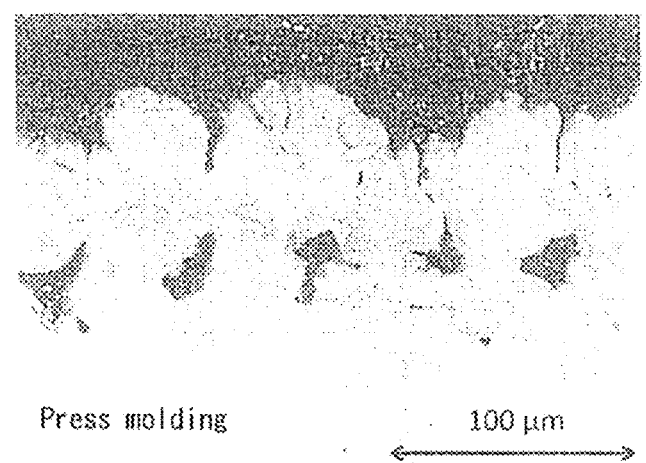
FIG. 24 is an SEM micrograph of the cross-section in the thickness direction of the composite molded article obtained in Example 10.

FIG. 24 is an SEM micrograph of the cross-section in the thickness direction of the composite molded article of Example 10 (cross-sectional view in A to C in FIG. 3).

The portion that appears relatively white is the metal molded article 10, and the portion that appears relatively black is the resin molded article 20.

In FIG. 24, plural holes formed in the thickness direction and plural independent spaces can be confirmed, and it can be conformed that the resin permeates thereinto since all the holes and spaces appear black.

The holes formed in the thickness direction are recognized as holes corresponding to the stem hole 32 of the open hole 30.

The independent spaces are recognized as the cross-section of the branch hole 33 that is formed from the inner wall of the stem hole 32 in a different direction from the stem hole 32, or as the internal space 40.

Assuming that the independent space is the internal space 40, it is considered that the internal space 40 is connected to the open hole 30 through the tunnel connecting channel 50 since the resin permeates thereinto.

Accordingly, the composite molded article of Example 10 has an increased bonding strength (S2) when pulling in a direction (Y direction in FIG. 1) perpendicular to the bonding surface 12.

Figure 25:
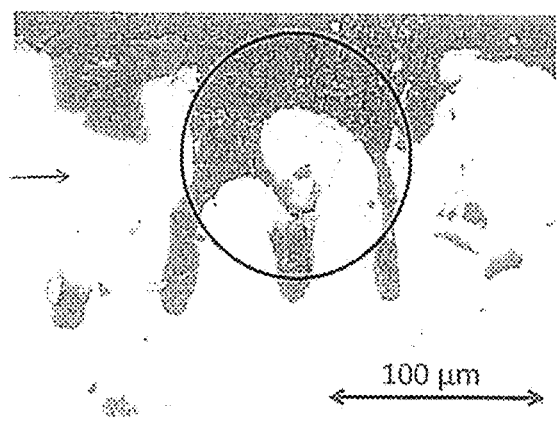
FIG. 25 is an SEM micrograph of the cross-section in the thickness direction of the composite molded article obtained in Example 11.

FIG. 25 is an SEM micrograph of the cross-section in the thickness direction of the composite molded article of Example 11 (cross-sectional view in A to C in FIG. 3).

The portion that appears relatively white is the metal molded article 10, and the portion that appears relatively black is the resin molded article 20.

In FIG. 25, plural holes formed in the thickness direction and plural independent spaces can be confirmed, and it can be conformed that the resin permeates thereinto since all the holes and spaces appear black.

The holes formed in the thickness direction are recognized as holes corresponding to the stem hole 32 of the open hole 30.

The independent spaces are recognized as the cross-section of the branch hole 33 that is formed from the inner wall of the stem hole 32 in a different direction from the stem hole 32, or as the internal space 40.

Assuming that the independent space is the internal space 40, it is considered that the internal space 40 is connected to the open hole 30 through the tunnel connecting channel 50 since the resin permeates thereinto.

Accordingly, the composite molded article of Example 11 has an increased bonding strength (S2) on pulling in the direction (Y direction in FIG. 1) perpendicular to the bonding surface 12.

Figure 26:
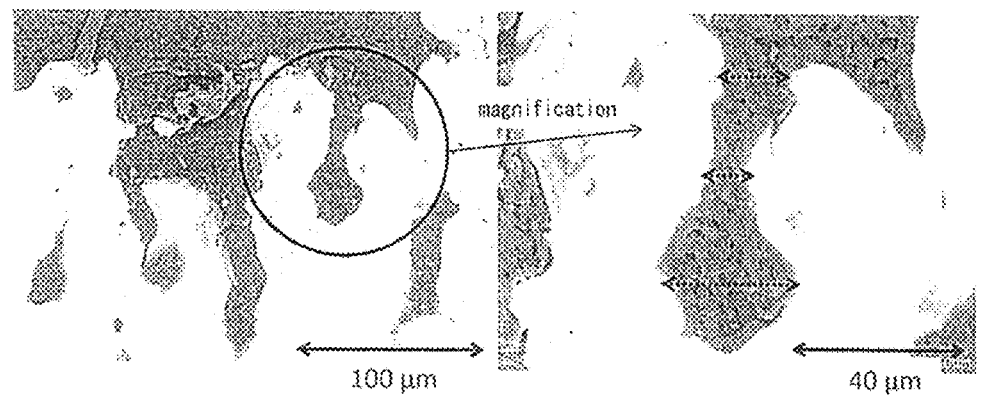
FIG. 26 is SEM micrographs of the cross-section in the thickness direction of the composite molded article obtained in Example 12.

FIG. 26 is an SEM micrograph of the cross-section in the thickness direction of the composite molded article of Example 12 (cross-sectional view in A to C in FIG. 3).

In FIG. 26, plural holes formed in the thickness direction and plural independent spaces can be confirmed, and it can be confirmed that the resin permeates thereinto since all the holes and spaces appear black.

The holes formed in the thickness direction are recognized as holes corresponding to the stem hole 32 of the open hole 30.

The independent spaces are recognized as the cross-section of the branch hole 33 that is formed from the inner wall of the stem hole 32 in a different direction from the stem hole 32, or as the internal space 40.

Assuming that the independent space is the internal space 40, it is considered that the internal space 40 is connected to the open hole 30 through the tunnel connecting channel 50 since the resin permeates thereinto.

Accordingly, the composite molded article of Example 12 has an increased bonding strength (S2) when pulling in a direction (Y direction in FIG. 1) perpendicular to the bonding surface 12.

Figure 27:
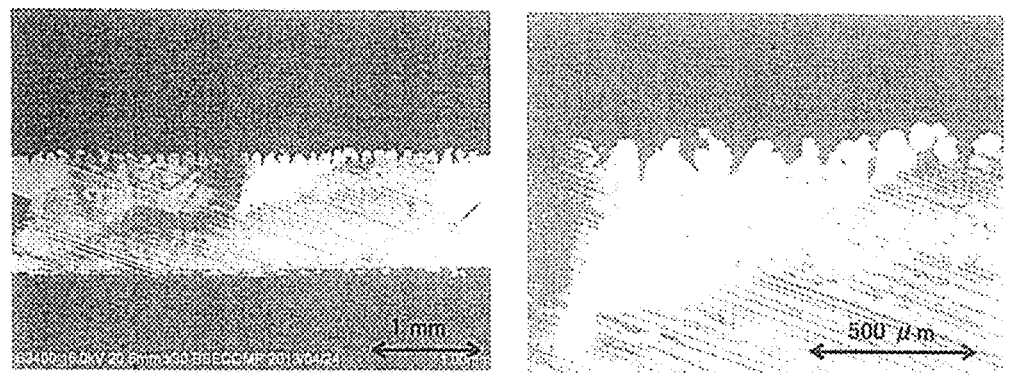
FIG. 27 is SEM micrographs of the cross-section in the thickness direction of the composite molded article obtained in Example 15.

FIG. 27 is an SEM micrograph of the cross-section in the thickness direction of the composite molded article of Example 15.

The portion that appears relatively white is the metal molded article 10, and the portion that appears relatively black is the resin molded article 20.

It can be confirmed that many open holes 30 are formed in the metal molded article 10.

Accordingly, the composite molded article of Example 15 has an increased bonding strength (S2) when pulling in a direction (Y direction in FIG. 1) perpendicular to the bonding surface 12.

Example 16

Figure 28:
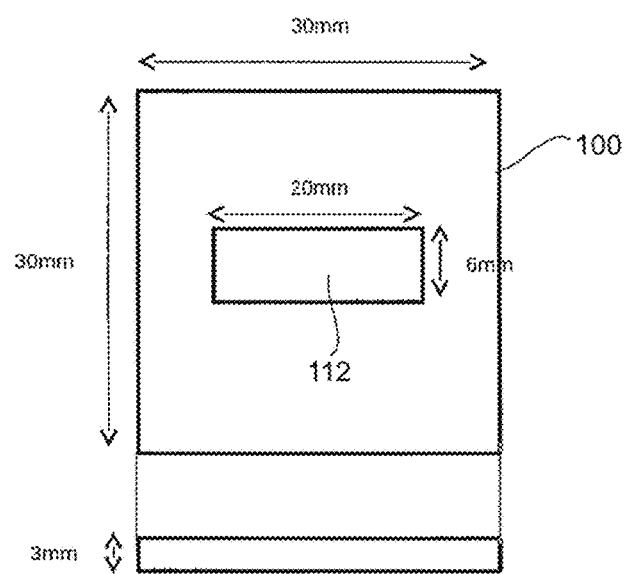
FIG. 28 is an illustrative diagram of a production method of a composite molded article comprising a metal molded article and a metal molded article.

In Example 16, the entire surface (an area of 120 mm$^2$) of a bonding surface 112 of a metal molded article 100 shown in FIG. 28 (thickness: 3 mm, (SUS304)), was continuously irradiated with laser light under the condition shown in Table 4.

Figure 29:
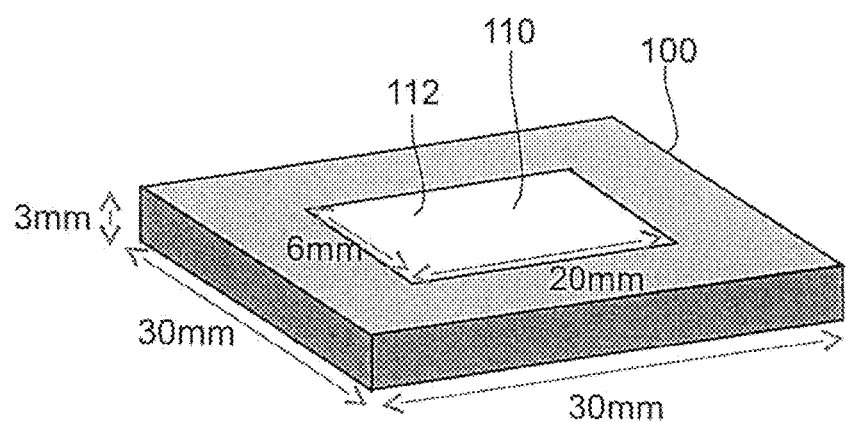
FIG. 29 is a perspective view of a composite molded article comprising a metal molded article and a metal molded article.

Subsequently, the metal molded article 100 thus treated was used, and soldering was performed according to the following manner, thereby providing a composite molded article of the metal molded article 100 (SUS304) and solder 110 shown in FIG. 29.

Figure 30:
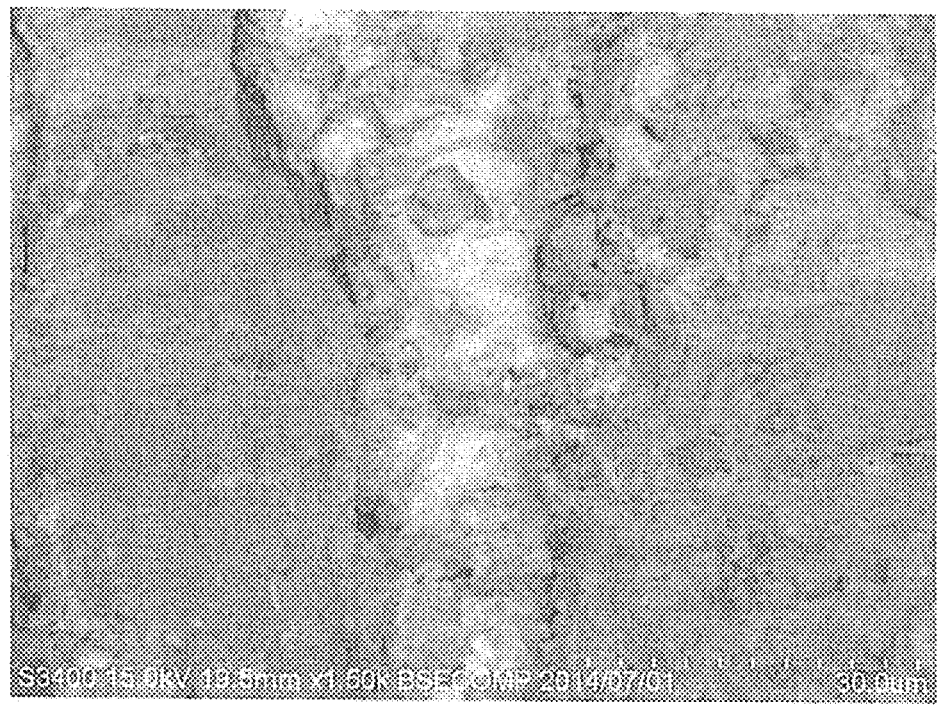
FIG. 30 is an SEM micrograph (magnification: 1,500) of a cross-section in the thickness direction of the composite molded article comprising a metal molded article and a metal molded article.

FIG. 30 is an SEM micrograph (magnification: 1,500) of the cross-section in the thickness direction of the composite molded article of SUS304 and solder. The portion that appears relatively white is solder, and the portion that appears relatively black is SUS304. It was confirmed that solder permeated into the depressed portions of the roughened surface of SUS304.

An untreated metal molded article 100 (SUS304) was tried to be subjected to soldering in the same manner as in Example 16 for the same area (an area of 120 mm²) as in Example 16, but the solder was repelled from the surface of the metal molded article 100 (SUS304) and spontaneously released therefrom without spreading over the surface, thereby failing to provide a molded article of SUS304 and solder bonded to each other.

<Method of Soldering>

A part of the surface of the bonding surface 112 (an area of 120 mm²) of the metal molded article (SUS304) 100 was heated by attaching a soldering iron thereto for approximately 10 seconds. Subsequently, solder (Hexsol, produced by Hakko Corporation) was lightly pressed onto the iron tip, and immediately after starting to melt the solder, the soldering iron and the solder were moved over the bonding surface to spread the molten solder thereover, followed by releasing the solder and the soldering iron from the surface of the metal molded article (SUS304) 100.

TABLE 4

|  | Example 16 |
| --- | --- |
| Laser oscillator | SMF laser |
| Waveform | continuous wave |
| Output power (W) | 274 |
| Wavelength (nm) | 1,070 |
| Spot diameter (μm) | 11 |
| Laser irradiation speed (mm/sec) | 7,500 |
| Number of lines | 120 |
| Line interval (b1) (mm) | 0.05 |
| Repetition number | 10 |
| Treated area (mm²) | 120 |
| Processing time (sec) | 5 |

Examples 17 and 18

Figure 31:
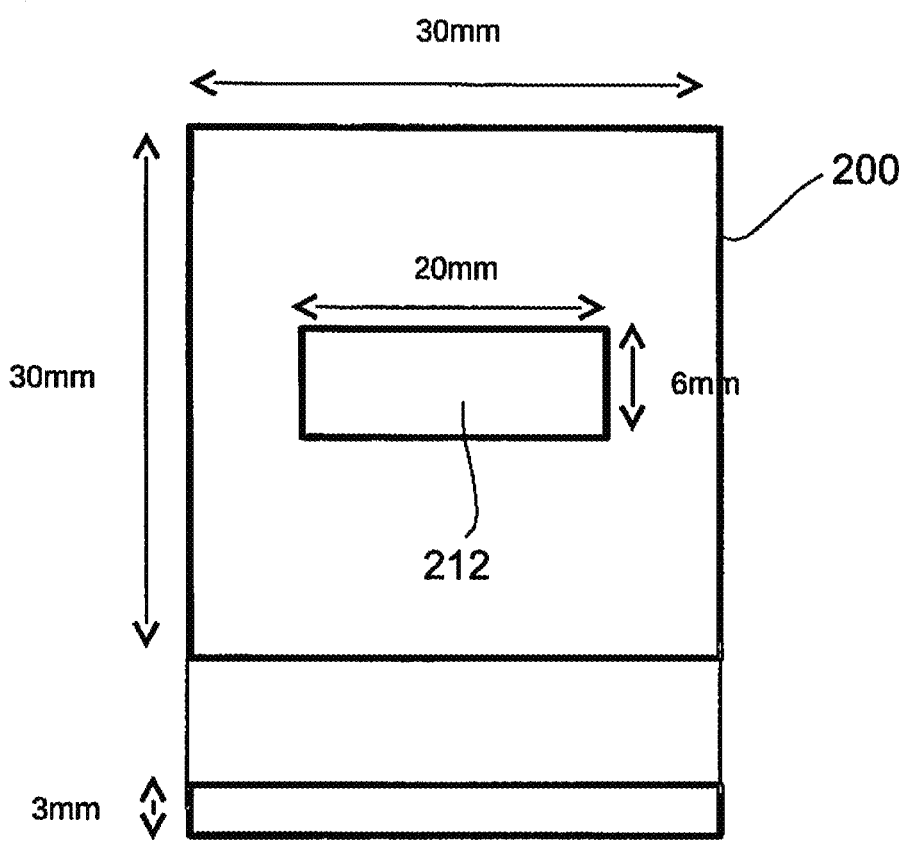
FIG. 31 is an illustrative diagram of a production method of a composite molded article comprising a metal molded article and a thermosetting resin.

In Example 17, the entire surface (an area of 120 mm²) of a bonding surface 212 of a metal molded article 200 shown in FIG. 31 (aluminum (A5052), thickness: 3 mm) was continuously irradiated with laser light under the conditions shown in Table 5.

Figure 32:
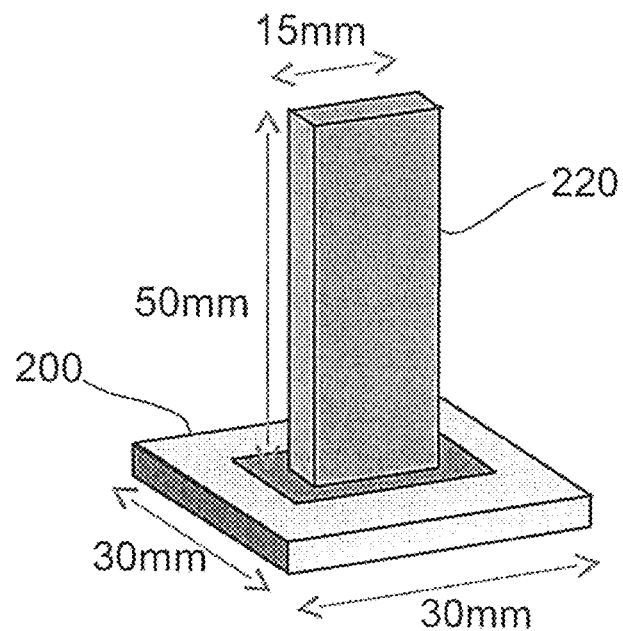
FIG. 32 is a perspective view of a composite molded article comprising a metal molded article and a thermosetting resin.

Subsequently, the metal molded article thus treated was used, and compression molding was performed according to the following manners, thereby providing a composite molded article of the metal molded article 200 (A5052) and a phenol resin molded article 220 shown in FIG. 32.

In Example 18, the entire surface (an area of 120 mm²) of a bonding surface 212 of a metal molded article 200 shown in FIG. 31 ((SUS304), thickness: 3 mm) was continuously irradiated with laser light under the conditions shown in Table 5.

Subsequently, the metal molded article thus treated was used, and compression molding was performed according to the following manners, thereby providing a composite molded article of the metal molded article 200 (SUS304) and a phenol resin molded article 220 shown in FIG. 32.

The composite molded articles of Examples 17 and 18 were subjected to a tensile test to evaluate the tensile bonding strength. The results are shown in Table 5.

An untreated metal molded article (aluminum (A5052)) having the same metal size as in Example 17 was subjected to compression molding in the following manners, but A5052 and the phenol resin were spontaneously released off from each other on taking out the molded article from the metal mold, thereby failing to provide a composite molded article.

An untreated metal molded article (SUS304) having the same metal size as in Example 18 was subjected to compression molding in the following manners, but SUS304 and the phenol resin were spontaneously released off from each other on taking out the molded article from the metal mold, thereby failing to provide a composite molded article.

<Compression Molding>

Resin: glass fiber (GF)-reinforced phenol resin (AV811, produced by Asahi Organic Chemicals Industry Co., Ltd.)
Metal mold temperature: 175° C.
Mold clamping pressure: 95 kg/cm²
Weight of resin specimen: 5.6 g
Heating time: 90 seconds
Compression molding machine: 26 t top flywheel type compression molding machine, produced by Toho Industrial Co., Ltd.

<Tensile Test Condition>

Test machine: Tensilon, produced by Orientec Co., Ltd. (UCT-1T)
Tensile speed: 5 mm/min
Chuck distance: 50 mm

TABLE 5

|  | Example 17 | Example 18 |
| --- | --- | --- |
| Kind of metal | A5052 | SUS304 |
| Kind of resin | phenol resin (containing GF) | phenol resin (containing GF) |
| Bonding method | compression molding | compression molding |
| Laser oscillator | SMF laser | SMF laser |
| Waveform | continuous wave | continuous wave |
| Output power (W) | 274 | 274 |
| Wavelength (nm) | 1,070 | 1,070 |
| Spot diameter (μm) | 11 | 11 |
| Laser irradiation speed (mm/sec) | 10,000 | 7,500 |
| Number of lines | 120 | 120 |
| Line interval (b1) (mm) | 0.05 | 0.05 |
| Repetition number | 20 | 15 |
| Treated area (mm²) | 120 | 120 |
| Processing time (sec) | 6.9 | 6.4 |
| Tensile bonding strength (MPa) | 22 | 20 |

Example 19 and Comparative Example 10

Figure 33:
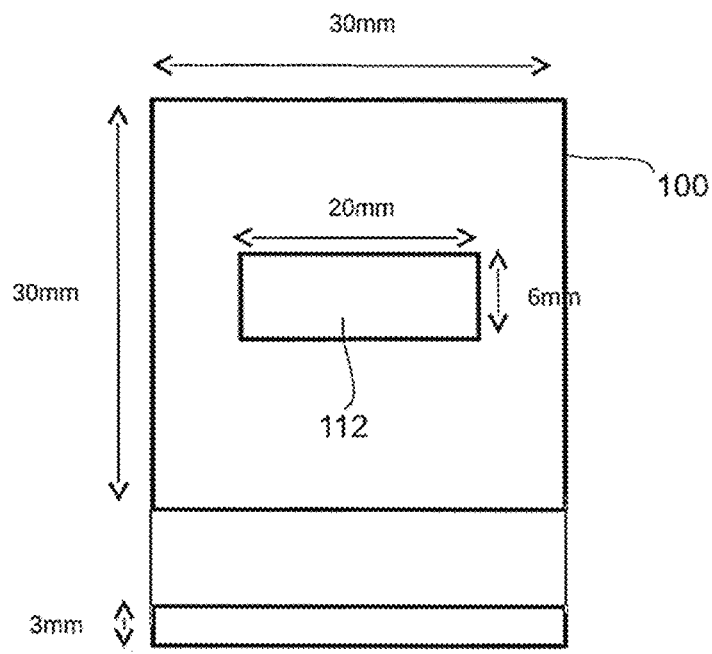
FIG. 33 is an illustrative diagram of a production method of a composite molded article comprising a metal molded article and a resin molded article (including an adhesive layer).

In Example 19, the entire surface (an area of 120 mm²) of a bonding surface 112 of a metal molded article 100 shown in FIG. 33 ((SUS304), thickness: 3 mm) was continuously irradiated with laser light under the conditions shown in Table 6.

Subsequently, by using the metal molded article 100 thus treated, an adhesive (MOS7-200, produced by Konishi Co., Ltd.) was coated on the bonding surface 112, and a glass fiber (GF)-60% reinforced PA66 resin (Plastron PA66-GF60-01 (L7), produced by Daicel Polymer Ltd.) was bonded thereto, thereby providing a composite molded article of the metal molded article 100 (SUS304) and a molded article 120 of PA66-GF60-01 (L7) shown in FIG. 34.

Figure 34:
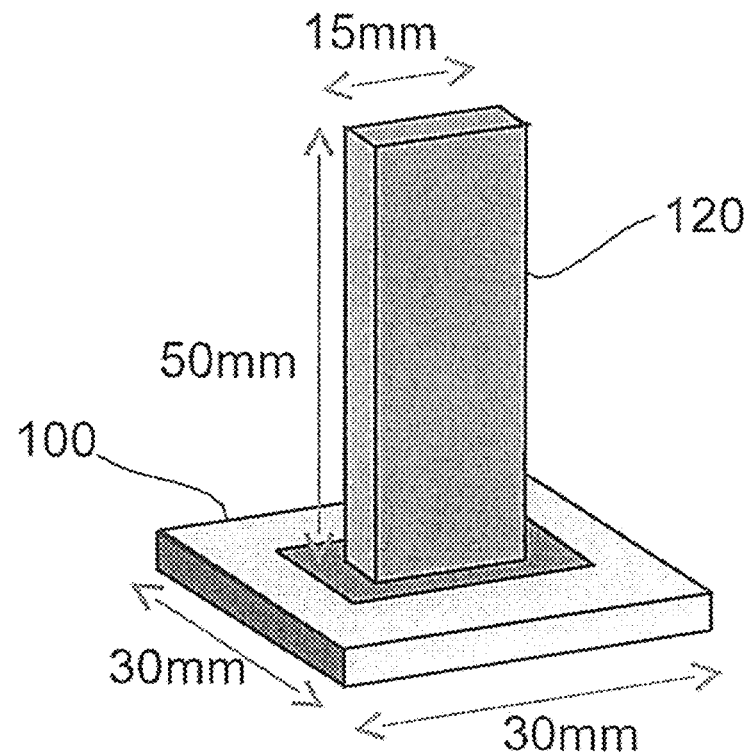
FIG. 34 is a perspective view of a composite molded article comprising a metal molded article and a resin molded article (including an adhesive layer).

In Comparative Example 10, an adhesive (MOS7-200, produced by Konishi Co., Ltd.) was coated on the surface of an untreated metal molded article (SUS304) having the same size as in Example 19, and a glass fiber (GF)-60% reinforced PA66 resin (Plastron PA66-GF60-01 (L7), produced by Daicel Polymer Ltd.) was bonded thereto, thereby providing a composite molded article of SUS304 and PA66-GF60-01 (L7) shown in FIG. 34.

The composite molded articles of Example 19 and Comparative Example 10 were subjected to a tensile test in the same manner as in Examples 17 and 18 to evaluate the tensile bonding strength. The results are shown in Table 6.

TABLE 6

|  | Example 19 | Comparative Example 10 |
|---|---|---|
| Kind of metal | SUS304 | SUS304 |
| Kind of resin | PA66 (containing GF) | PA66 (containing GF) |
| Bonding method | adhesive | adhesive |
| Laser oscillator | SMF laser | — |
| Waveform | continuous wave | — |
| Output power (W) | 274 | — |
| Wavelength (nm) | 1,070 | — |
| Spot diameter (μm) | 11 | — |
| Laser irradiation speed (mm/sec) | 7,500 | — |
| Number of lines | 120 | — |
| Line interval (b1) (mm) | 0.05 | — |
| Repetition number | 10 | — |
| Treated area (mm$^2$) | 120 | — |
| Processing time (sec) | 4.6 | — |
| Tensile bonding strength (MPa) | 5 | 1 |

Example 20 and Comparative Example 11

Figure 35:
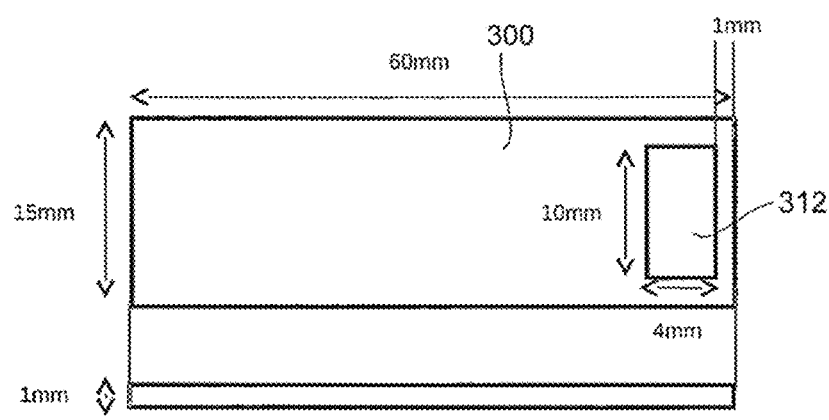
FIG. 35 is an illustrative diagram of a production method of a composite molded article containing a metal molded article and a metal molded article (including an adhesive layer).

In Example 20, the entire surface (an area of 40 mm$^2$) of a bonding surface 312 of a metal molded article 300 shown in FIG. 35 (aluminum (A5052), thickness: 1 mm) was continuously irradiated with laser light under the conditions shown in Table 7.

Subsequently, by using the metal molded article 300 thus treated, an adhesive (MOST-200, produced by Konishi Co., Ltd.) was coated on the bonding surface 312, and the metal molded article 320 (aluminum (A5052)) having been treated with laser light in the same manner as above was bonded thereto, thereby providing a composite molded article of the metal molded article 300 (A5052) and the metal molded article 320 (A5052) shown in FIG. 36.

Figure 36:
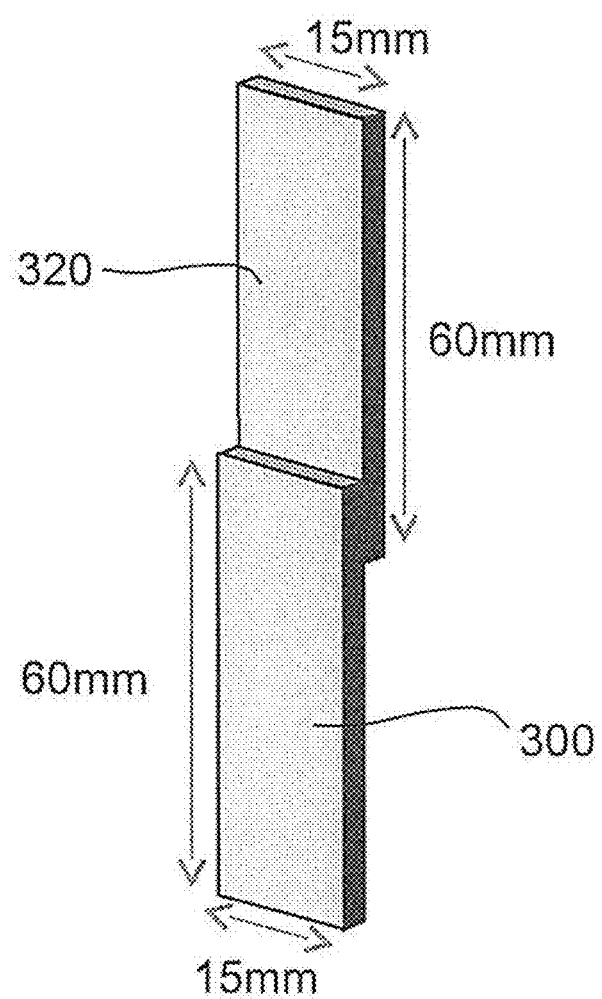
FIG. 36 is a perspective view of a composite molded article comprising a metal molded article and a metal molded article (including an adhesive layer).

In Comparative Example 11, an adhesive (MOS7-200, produced by Konishi Co., Ltd.) was coated on an untreated metal molded article (A5052) having the same size as in Example 20, and the same untreated metal molded article was bonded thereto, thereby providing a composite molded article of the metal molded article 300 (A5052) and the metal molded article 320 (A5052) shown in FIG. 36.

Figure 37:
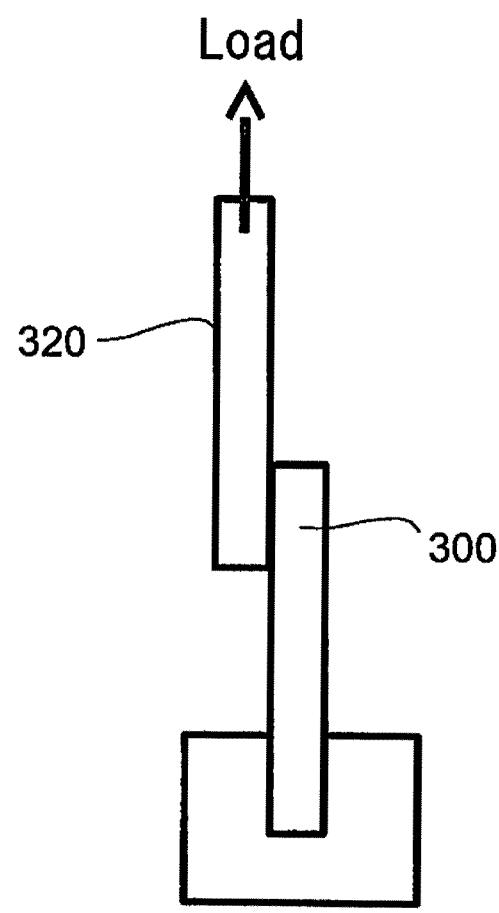
FIG. 37 is an illustrative diagram of a shearing test of a composite molded article comprising a metal molded article and a metal molded article (including an adhesive layer).

The composite molded articles of Example 20 and Comparative Example 11 were subjected to a shearing test shown in FIG. 37 to evaluate the shear bonding strength. The results are shown in Table 7.
<Searing Test Condition>
Test machine: Tensilon, produced by Orientec Co., Ltd. (UCT-1T)
Tensile speed: 5 mm/min
Chuck distance: 50 mm

TABLE 7

|  | Example 20 | Comparative Example 11 |
|---|---|---|
| Kind of metal | A5052 | A5052 |
| Bonding method | adhesive | adhesive |
| Laser oscillator | SMF laser | — |
| Waveform | continuous wave | — |
| Output power (W) | 274 | — |
| Wavelength (nm) | 1,070 | — |
| Spot diameter (μm) | 11 | — |
| Laser irradiation speed (mm/sec) | 10,000 | — |
| Number of lines | 80 | — |
| Line interval (b1) (mm) | 0.05 | — |
| Repetition number | 10 | — |
| Treated area (mm$^2$) | 40 | — |
| Processing time (sec) | 3.0 | — |
| Tensile bonding strength (MPa) | 6 | 2 |

The composite molded article of the present invention in the case where a metal molded article is used as the first molded article and a resin molded article is used as the second molded article has a high strength and a light weight, and thus can be used as a substitute for a metal.

The composite molded article of the present invention in the case where a metal molded article is used as the first molded article and a metal molded article that is different from the first molded article is used as the second molded article has different properties between one surface and the opposite surface thereof.

Accordingly, the composite molded article of the present invention can be used as an interior member and an exterior member of an automobile, a housing of an electric equipment or an electronic equipment, and the like.

DESCRIPTION OF SYMBOLS

1 composite molded article
10 metal molded article
12 bonding surface
20 resin molded article

The invention claimed is:
1. A monolithic metal molded article with a roughened surface,
   wherein an integral surface layer portion of the monolithic metal molded article includes the roughened surface and comprises:
   open holes containing stem holes and branch holes, the stem holes being formed in a thickness direction and having openings on the side of the surface, and the branch holes being formed from inner walls of the stem holes in a direction different from the stem holes, and
   internal spaces formed in a thickness direction, the internal spaces having no openings on the side of the surface,
   the surface layer portion is a portion extending from the surface to the depth of the open holes formed by roughening and further comprises
   tunnel connecting channels that connect the open holes and the internal spaces and tunnel connecting channels that connect the open holes with each other.
2. The metal molded article of claim 1, wherein the surface layer portion of the metal molded article extends from the surface to the depth of the open holes, and is of a depth in a range of from 50 to 500 μm.
3. A composite molded article comprising a first molded article and a second molded article bonded to each other, the second molded article is formed of a constitutional material that is different from the first molded article, the first molded article is the metal molded article of claim 1 and the roughened surface is a bonding surface, the first molded article and the second molded article are bonded in such a state that the constitutional material of the second molded article permeates into each of the open holes, the tunnel connecting channels and the internal spaces formed in the surface layer portion of the first molded article.

4. A composite molded article comprising a monolithic metal molded article and a molded article of a resin, rubber or elastomer, which are bonded to each other, wherein the monolithic metal molded article is the monolithic metal molded article of claim 1 and the roughened surface is a bonding surface, and the monolithic metal molded article and the molded article of a resin, rubber or elastomer are bonded in such a state that the resin, rubber or elastomer permeates into each of the open holes, the tunnel connecting channels, and the internal spaces formed in the surface layer portion of the monolithic metal molded article.

5. A composite molded article comprising a metal molded article and a molded article of a resin, rubber or elastomer, which are bonded to each other through an adhesive layer, wherein the metal molded article is the metal molded article of claim 1 and the roughened surface is a bonding surface, the adhesive layer is formed on the bonding surface of the metal molded article, and the metal molded article and the molded article of a resin, rubber or elastomer are bonded in such a state that the adhesive permeates into each of the open holes, the tunnel connecting channels, and the internal spaces formed in the surface layer portion of the metal molded article.

6. A composite molded article comprising a first metal molded article and a second metal molded article formed of a metal with a melting point lower than that of the first metal molded article, which are bonded to each other, wherein the first metal molded article is the metal molded article of claim 1 and the roughened surface is a bonding surface, and the first metal molded article and the second metal molded article are bonded in such a state that the metal forming the second metal molded article permeates into each of the open holes, the tunnel connecting channels, and the internal spaces formed in the surface layer portion of the first metal molded article.

7. A composite molded article comprising a first metal molded article and a second metal molded article, which are bonded to each other through an adhesive layer, wherein the first metal molded article is the metal molded article of claim 1 and the roughened surface is a bonding surface, the adhesive layer is formed on the bonding surface of the first metal molded article, and the first metal molded article and the second metal molded article are bonded in such a state that the adhesive permeates into each of the open holes, the tunnel connecting channels, and the internal spaces formed in the surface layer portion of the first metal molded article.

8. The composite molded article of claim 3, wherein the surface layer portion of the metal molded article extends from the surface to the depth of the open holes, and is of a depth in a range of from 50 to 500 µm.

* * * * *

UNITED STATES PATENT AND TRADEMARK OFFICE
CERTIFICATE OF CORRECTION

PATENT NO. : 10,434,741 B2
APPLICATION NO. : 14/905357
DATED : October 8, 2019
INVENTOR(S) : Daiji Ikeda et al.

It is certified that error appears in the above-identified patent and that said Letters Patent is hereby corrected as shown below:

On the Title Page

Change: "(30) Foreign Application Priority Data
     April 25, 2014  (JP).....................2014-090885"

To: ---(30) Foreign Application Priority Data
     July 18, 2013   (JP).....................2013-149093
     April 25, 2014  (JP).....................2014-090885---

Signed and Sealed this
Twenty-sixth Day of November, 2019

Andrei Iancu
*Director of the United States Patent and Trademark Office*